(12) United States Patent
Yamamoto et al.

(10) Patent No.: US 10,468,717 B2
(45) Date of Patent: Nov. 5, 2019

(54) ELECTROLYTE, BATTERY, AND ELECTRONIC APPARATUS

(71) Applicant: SEIKO EPSON CORPORATION, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 13 days.

(21) Appl. No.: 15/995,683

(22) Filed: Jun. 1, 2018

(65) Prior Publication Data

US 2018/0375150 A1 Dec. 27, 2018

(30) Foreign Application Priority Data

Jun. 22, 2017 (JP) ................. 2017-121991

(51) Int. Cl.
| | |
|---|---|
| *H01M 4/00* | (2006.01) |
| *H01M 10/0562* | (2010.01) |
| *H01M 10/052* | (2010.01) |
| *H01M 4/66* | (2006.01) |
| *G04C 10/00* | (2006.01) |
| *H01M 4/38* | (2006.01) |
| *G04G 21/02* | (2010.01) |
| *H01M 4/13* | (2010.01) |
| *H01M 4/62* | (2006.01) |
| *H01M 4/131* | (2010.01) |
| *H01M 4/02* | (2006.01) |

(52) U.S. Cl.
CPC ........ *H01M 10/0562* (2013.01); *G04C 10/00* (2013.01); *G04G 21/025* (2013.01); *H01M 4/13* (2013.01); *H01M 4/382* (2013.01); *H01M 4/62* (2013.01); *H01M 4/661* (2013.01); *H01M 10/052* (2013.01); *H01M 4/131* (2013.01); *H01M 2004/027* (2013.01); *H01M 2004/028* (2013.01); *H01M 2300/0037* (2013.01); *H01M 2300/0071* (2013.01)

(58) Field of Classification Search
CPC ....................................................... H01M 4/00
See application file for complete search history.

(56) References Cited

U.S. PATENT DOCUMENTS

| | | | |
|---|---|---|---|
| 2002/0031694 A1* | 3/2002 | Van Berkel | ............... C25B 3/02 429/213 |
| 2011/0059369 A1 | 3/2011 | Nan et al. | |
| 2015/0056519 A1 | 2/2015 | Ohta et al. | |

FOREIGN PATENT DOCUMENTS

| | | |
|---|---|---|
| JP | 2003-346895 A | 12/2003 |
| JP | 2009-215130 A | 9/2009 |
| JP | 2011-529243 A | 12/2011 |
| JP | 2015-041573 A | 3/2015 |

(Continued)

*Primary Examiner* — Jacob B Marks
(74) *Attorney, Agent, or Firm* — Oliff PLC

(57) ABSTRACT

An electrolyte includes a first electrolyte, in which an element constituting a crystalline lithium composite metal oxide represented by the following compositional formula (1) is substituted with a first metal element having a crystal radius of 78 pm or more, and an amorphous second electrolyte, which contains Li and a second metal element contained in the first electrolyte other than Li.

$$(Li_{7-3x+y}Ga_x)(La_{3-y}Ca_y)Zr_2O_{12} \qquad (1)$$

(In the formula (1), x and y satisfy the following formulae: $0.1 \leq x \leq 0.6$ and $0.0 < y \leq 0.3$).

17 Claims, 9 Drawing Sheets

(56) References Cited

FOREIGN PATENT DOCUMENTS

| | | |
|---|---|---|
| JP | 2017-162728 A | 9/2017 |
| JP | 2017-168395 A | 9/2017 |
| JP | 2017-168396 A | 9/2017 |
| WO | 2010/009680 A1 | 1/2010 |

* cited by examiner

FIG. 5

| | SOLID ELECTROLYTE | |
|---|---|---|
| | FIRST ELECTROLYTE AND SECOND ELECTROLYTE | THIRD ELECTROLYTE |
| EXAMPLE 1 | $Li_{5.1}Ga_{0.5}La_{2.95}Ca_{0.05}Zr_{1.55}Nb_{0.25}Sb_{0.2}O_{12}$ | (WITHOUT) |
| EXAMPLE 2 | $Li_{5.1}Ga_{0.5}La_{2.95}Ca_{0.05}Zr_{1.55}Nb_{0.25}Sb_{0.2}O_{12}$ | LCBO |
| EXAMPLE 3 | $Li_{4.85}Ga_{0.5}La_{2.95}Ca_{0.05}Zr_{1.30}Sb_{0.45}Ta_{0.25}O_{12}$ | (WITHOUT) |
| EXAMPLE 4 | $Li_{4.85}Ga_{0.5}La_{2.95}Ca_{0.05}Zr_{1.30}Sb_{0.45}Ta_{0.25}O_{12}$ | LCBO |
| EXAMPLE 5 | $Li_{5.11}Ga_{0.5}La_{2.95}Ca_{0.05}Zr_{1.56}Nb_{0.22}Ta_{0.22}O_{12}$ | (WITHOUT) |
| EXAMPLE 6 | $Li_{5.11}Ga_{0.5}La_{2.95}Ca_{0.05}Zr_{1.56}Nb_{0.22}Ta_{0.22}O_{12}$ | LCBO |
| EXAMPLE 7 | $Li_{4.5}Ga_{0.5}La_{2.95}Ca_{0.05}Zr_{1.35}Nb_{0.25}Sb_{0.4}Ta_{0.4}O_{12}$ | (WITHOUT) |
| EXAMPLE 8 | $Li_{4.5}Ga_{0.5}La_{2.95}Ca_{0.05}Zr_{1.35}Nb_{0.25}Sb_{0.4}Ta_{0.4}O_{12}$ | LCBO |
| COMPARATIVE EXAMPLE 1 | $Li_6Ga_{0.5}La_{2.5}Ca_{0.5}Zr_2O_{12}$ | LCBO |
| COMPARATIVE EXAMPLE 2 | $Li_{6.5}La_3Zr_{1.5}Nb_{0.25}Sb_{0.25}O_{12}$ | LCBO |

FIG. 6

| | LITHIUM ION CONDUCTIVITY [S/cm] | | |
|---|---|---|---|
| | GRAIN BULK CONDUCTIVITY | GRAIN BOUNDARY CONDUCTIVITY | TOTAL ION CONDUCTIVITY |
| EXAMPLE 1 | — | — | $5.0 \times 10^{-4}$ |
| EXAMPLE 3 | — | — | $7.8 \times 10^{-4}$ |
| EXAMPLE 5 | — | — | $5.2 \times 10^{-4}$ |
| EXAMPLE 7 | — | — | $5.5 \times 10^{-4}$ |
| COMPARATIVE EXAMPLE 1 | $5.5 \times 10^{-3}$ | $1.2 \times 10^{-4}$ | $1.2 \times 10^{-4}$ |
| COMPARATIVE EXAMPLE 2 | — | — | $1.2 \times 10^{-4}$ |

| | CHARGE CONDITIONS | | CHARGE CAPACITY [μAh] | | DISCHARGE CONDITIONS | | DISCHARGE CAPACITY [μAh] | | DISCHARGE CAPACITY RETENTION RATIO |
|---|---|---|---|---|---|---|---|---|---|
| | CHARGE CURRENT [μA] | CHARGE RATE | 1ST TIME | 10TH TIME | DISCHARGE CURRENT [μA] | DISCHARGE RATE | 1ST TIME | 10TH TIME | |
| EXAMPLE 1 | 50 | 0.1C | 500 | 500 | 50 | 0.1C | 450 | 405 | 90% |
| EXAMPLE 2 | 150 | 0.3C | 500 | 500 | 150 | 0.3C | 450 | 405 | 90% |
| EXAMPLE 3 | 50 | 0.1C | 500 | 500 | 50 | 0.1C | 465 | 420 | 90% |
| EXAMPLE 4 | 150 | 0.3C | 500 | 500 | 150 | 0.3C | 465 | 420 | 90% |
| EXAMPLE 5 | 50 | 0.1C | 500 | 500 | 50 | 0.1C | 450 | 405 | 90% |
| EXAMPLE 6 | 150 | 0.3C | 500 | 500 | 150 | 0.3C | 450 | 405 | 90% |
| EXAMPLE 7 | 50 | 0.1C | 500 | 500 | 50 | 0.1C | 450 | 405 | 90% |
| EXAMPLE 8 | 150 | 0.3C | 500 | 500 | 150 | 0.3C | 450 | 405 | 90% |
| COMPARATIVE EXAMPLE 1 | 1 | 0.002C | 500 | 500 | 1 | 0.002C | 450 | 350 | 78% |
| COMPARATIVE EXAMPLE 2 | 20 | 0.04C | 500 | 500 | 20 | 0.04C | 420 | 290 | 69% |

FIG. 9

ELECTROLYTE, BATTERY, AND ELECTRONIC APPARATUS

BACKGROUND

1. Technical Field

The present invention relates to an electrolyte, a battery, and an electronic apparatus.

2. Related Art

Heretofore, there has been known a battery using an inorganic electrolyte in place of an organic electrolyte solution as an electrolyte. For example, JP-A-2015-41573 (Patent Document 1) proposes a garnet-type ion conductive oxide, in which zirconium sites are partially substituted with niobium, lanthanum sites are partially substituted with calcium, and lithium sites are partially substituted with aluminum in lithium lanthanum zirconate having a garnet-type crystal structure, as an electrolyte which enables sintering at a low temperature.

However, when firing is performed at a low temperature using the garnet-type ion conductive oxide described in Patent Document 1, an interface between crystal grains is not sufficiently sintered, and there is a problem that it is difficult to achieve both decrease in the crystal grain boundary resistance and improvement of the lithium ion conduction property (total ion conductivity).

SUMMARY

An advantage of some aspects of the invention is to solve at least part of the above-mentioned problems and the invention can be implemented as the following forms or application examples.

Application Example

An electrolyte according to this application example includes a first electrolyte, in which at least one type of element among the elements constituting a crystalline lithium composite metal oxide represented by the following compositional formula (1) is substituted with a metal element having a crystal radius of 78 pm or more, and an amorphous second electrolyte, which contains Li and one or more types of metal elements contained in the first electrolyte other than Li.

$$(Li_{7-3x+y}Ga_x)(La_{3-y}Ca_y)Zr_2O_{12} \quad (1)$$

In the formula (1), x and y satisfy the following formulae: $0.1 \leq x \leq 0.6$ and $0.0 < y \leq 0.3$.

According to this application example, the electrolyte includes the crystalline first electrolyte and the amorphous second electrolyte, and therefore, as compared with the case where an electrolyte is constituted by only a crystalline material and the first electrolytes are bonded to each other, a resistance occurring at the crystal interface (grain boundary resistance) of the first electrolyte is decreased. Moreover, even if firing is performed at a low temperature as in the related art, the stabilization of the crystal (cubic crystal) in the first electrolyte is promoted, and therefore, the lithium ion conduction property of the electrolyte can be improved.

The first electrolyte is a crystalline lithium composite metal oxide having the compositional formula (1) as a basic structure. By using such a garnet-type crystal or a garnet-like-type crystal as the first electrolyte, the bulk lithium ion conductivity (grain bulk conductivity) can be improved in the electrolyte.

In the first electrolyte, at least one type of element among the constituent elements of the compositional formula (1) is substituted with a metal element having a crystal radius of 78 pm or more. Therefore, the concentration gradient of the metal element occurs between the crystalline first electrolyte and the amorphous second electrolyte. Due to this, the boundary between the first electrolyte and the second electrolyte gets into an ambiguous state, and as compared with the case where the boundary is clear, the grain boundary resistance is decreased, and the lithium ion conduction property can be further improved. In addition, the metal element having a crystal radius of 78 pm or more hardly comes out of the first electrolyte even by firing at a relatively high temperature, and a stable lithium ion conduction property can be obtained.

According to this configuration, an electrolyte having a decreased grain boundary resistance and an improved lithium ion conduction property as compared with the related art can be provided.

In the electrolyte according to the above-mentioned application example, it is preferred that in the first electrolyte, Zr among the elements constituting the lithium composite metal oxide is partially substituted with a metal element having a crystal radius of 78 pm or more.

According to this configuration, Zr is partially substituted with a metal element having a crystal radius of 78 pm or more, and therefore, an excellent lithium ion conduction property can be realized.

In the electrolyte according to the above-mentioned application example, it is preferred that the first electrolyte contains a crystalline lithium composite metal oxide represented by the following compositional formula (2).

$$(Li_{7-3x+y-z}Ga_x)(La_{3-y}Ca_y)(Zr_{2-z}M_z)O_{12} \quad (2)$$

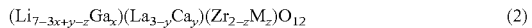

In the formula (2), x, y, and z satisfy the following formulae: $0.1 \leq x \leq 0.6$, $0.0 < y \leq 0.3$, and $0.1 \leq z \leq 0.6$, and M represents a metal element having a crystal radius of 78 pm or more.

According to this configuration, Zr is partially substituted with a metal element having a crystal radius of 78 pm or more, and therefore, an excellent lithium ion conduction property can be realized.

In the electrolyte according to the above-mentioned application example, it is preferred that the first electrolyte contains one or more types among Nb, Sb, and Ta, each of which is a metal element having a crystal radius of 78 pm or more.

According to this configuration, in the first electrolyte, at least one type of element among the elements constituting the lithium composite metal oxide is substituted with Nb, Sb, or Ta, and therefore, an excellent lithium ion conduction property can be realized.

In the electrolyte according to the above-mentioned application example, it is preferred that the second electrolyte contains one or more types among Nb, Sb, and Ta, each of which is a metal element having a crystal radius of 78 pm or more, and Li, La, and Zr.

According to this configuration, since there is a difference in ease of entry into the crystal lattice of the first electrolyte among Nb, Sb, and Ta, the concentration gradient of one or more types of metal elements among Nb, Sb, and Ta occurs from the first electrolyte to the second electrolyte. That is, from the first electrolyte to the second electrolyte, the concentration of a metal element whose ease of entry described above is high gradually decreases, and the concentration of a metal element whose ease of entry described above is low gradually increases. According to this configuration, the boundary between the first electrolyte and the second electrolyte becomes ambiguous. Therefore, as compared with the case where the boundary is clear, the grain boundary resistance is decreased, and the lithium ion conduction property can be further improved.

In the electrolyte according to the above-mentioned application example, it is preferred that an amorphous third electrolyte, which contains Li and is in contact with the first electrolyte and the second electrolyte is included.

According to this configuration, the first electrolyte is bonded not only to the second electrolyte, but also to the third electrolyte, and therefore, the resistance occurring at the crystal interface of the first electrolyte is further decreased. Moreover, the lithium ion conduction property of the electrolyte can be further improved.

In the electrolyte according to the above-mentioned application example, it is preferred that the third electrolyte contains Li, B, and O.

According to this configuration, the amorphous third electrolyte is easily formed, and the lithium ion conduction property of the electrolyte can be further more improved.

Application Example

A battery according to this application example includes a composite body which contains the electrolyte according to the above-mentioned application example and an active material, an electrode which is provided on one side of the composite body, and a current collector which is provided on the other side of the composite body.

According to this application example, the electrolyte having a decreased grain boundary resistance and an improved lithium ion conduction property is used, and therefore, a battery having improved charge-discharge characteristics can be formed.

In the battery according to the above-mentioned application example, it is preferred that the active material is a positive electrode active material containing Li.

According to this configuration, the battery includes the positive electrode active material to serve as a lithium supply source, and therefore, the charge-discharge characteristics can be further improved. In addition, the capacity of the battery can be increased as compared with the related art.

Application Example

An electronic apparatus according to this application example includes the battery according to the above-mentioned application example.

According to this application example, an electronic apparatus including the battery, which has improved charge-discharge characteristics, is small, and has a high quality, as a power supply source can be provided.

Application Example

A method for producing an electrolyte according to this application example includes: mixing a plurality of types of raw materials containing the elements constituting a crystalline lithium composite metal oxide represented by the following compositional formula (1) and a metal element having a crystal radius of 78 pm or more, respectively, thereby preparing a mixture, and a step of subjecting the mixture to a heating treatment, thereby forming a crystalline first electrolyte and an amorphous second electrolyte.

$$(Li_{7-3x+y}Ga_x)(La_{3-y}Ca_y)Zr_2O_{12} \tag{1}$$

In the formula (1), x and y satisfy the following formulae: $0.1 \leq x \leq 0.6$ and $0.0 < y \leq 0.3$.

According to this application example, the first electrolyte in which Zr among the elements constituting the crystalline lithium composite metal oxide represented by the compositional formula (1) is partially substituted with a metal element having a crystal radius of 78 pm or more and the amorphous second electrolyte containing a metal element having a crystal radius of 78 pm or more and Li, La, and Zr can be formed in the same step. Specifically, Zr constituting the lithium composite metal oxide of the compositional formula (1) is substituted with the metal element, whereby the crystal of the first electrolyte is formed. At this time, the amorphous second electrolyte is formed in a state of being bonded to the first electrolyte from the raw materials which do not contribute to the formation of the crystalline first electrolyte. According to such a method for producing an electrolyte, the concentration gradient of the metal element occurs between the first electrolyte and the second electrolyte, and the boundary between the first electrolyte and the second electrolyte becomes ambiguous. Due to this, an electrolyte having a reduced grain boundary resistance and an improved lithium ion conduction property can be produced. Further, the first electrolyte and the second electrolyte are formed in the same step, and therefore, the production step of the electrolyte can be simplified.

In the method for producing an electrolyte according to the above-mentioned application example, it is preferred that a step of dissolving the raw materials in a solvent is included, the mixture contains the solvent, and the heating treatment includes a first heating treatment in which the heating temperature is 500° C. or higher and 650° C. or lower, and a second heating treatment which is performed after the first heating treatment, and in which the heating temperature is 800° C. or higher and 950° C. or lower.

According to this configuration, the first electrolyte and the second electrolyte are formed by a liquid phase method. In particular, the crystal grain of the first electrolyte is crystallized from the solution of the mixture, and therefore, the micronization is facilitated as compared with a solid phase method. Further, by the first heating treatment, a solvent contained in the mixture or an organic substance such as an impurity is decomposed and reduced. Therefore, in the second heating treatment, the purity is increased, and the first electrolyte and the second electrolyte can be formed. Further, by setting the temperature of the heating treatment lower than 1000° C., volatilization of lithium can be suppressed. Accordingly, an electrolyte having a further improved lithium ion conduction property can be produced.

Application Example

A method for producing a battery according to this application example includes a step of dissolving a plurality of types of raw materials containing the elements constituting a crystalline lithium composite metal oxide represented by the following compositional formula (1) and a metal element having a crystal radius of 78 pm or more, respectively, in a solvent, followed by mixing, thereby preparing a mixture, a step of forming a first molded body using an active material, a step of subjecting the mixture to a heating treatment in a state of being impregnated into the first molded body to cause a reaction, thereby forming a second molded body containing a crystalline first electrolyte and an amorphous second electrolyte obtained after the reaction, and the first molded body, a step of melting a third electrolyte containing Li, B, and O by heating in a state where the third electrolyte is brought into contact with the second molded body, thereby filling the second molded body with the melt of the third electrolyte, a step of cooling the second molded body filled with the melt of the third electrolyte, thereby forming a composite body which contains the first electrolyte, the second electrolyte, the third electrolyte, and the active material, and a step of forming a current collector on the composite body.

$$(Li_{7-3x+y}Ga_x)(La_{3-y}Ca_y)Zr_2O_{12} \quad (1)$$

In the formula (1), x and y satisfy the following formulae: $0.1 \leq x \leq 0.6$ and $0.0 < y \leq 0.3$.

According to this application example, in the inside including the surface of the first molded body containing the active material, the first electrolyte and the second electrolyte are formed by a liquid phase method, whereby the second molded body is produced. Further, in the inside including the surface of the second molded body, the melt of the third electrolyte is filled, whereby the composite body is produced. Therefore, the active material is in contact with the first electrolyte and the second electrolyte, and thus, the composite body is formed such that the first electrolyte, the second electrolyte, and the third electrolyte are in contact with one another. The composite body having such a configuration can be easily produced, and also a battery in which the grain boundary resistance of the electrolyte is decreased by the configuration, and the lithium ion conduction property is improved can be produced.

In the method for producing a battery according to the above-mentioned application example, it is preferred that the heating treatment includes a first heating treatment in which the heating temperature is 500° C. or higher and 650° C. or lower, and a second heating treatment which is performed after the first heating treatment, and in which the heating temperature is 800° C. or higher and 950° C. or lower.

According to this configuration, by the first heating treatment, a solvent contained in the mixture or an organic substance such as an impurity is decomposed and reduced. Therefore, in the second heating treatment, the purity is increased, and the first electrolyte and the second electrolyte can be formed. Further, by setting the temperature of the heating treatment lower than 1000° C., volatilization of lithium can be suppressed. Accordingly, a battery having a further improved lithium ion conduction property can be produced.

BRIEF DESCRIPTION OF THE DRAWINGS

The invention will be described with reference to the accompanying drawings, wherein like numbers reference like elements.

FIG. 5 is a table showing the compositions of solid electrolytes according to Examples and Comparative Examples.

FIG. 6 is a table showing the evaluation results of lithium ion conductivities according to Examples and Comparative Examples.

FIG. 9 is a table showing the charge and discharge conditions and the evaluation results of lithium batteries of Examples and Comparative Examples.

DESCRIPTION OF EXEMPLARY EMBODIMENTS

Hereinafter, embodiments of the invention will be described with reference to the drawings. Incidentally, in the following respective drawings, in order to make respective layers and respective members have a recognizable size, the dimensions of the respective layers and the respective members are made different from the actual ones.

First Embodiment

Battery

Figure 1:
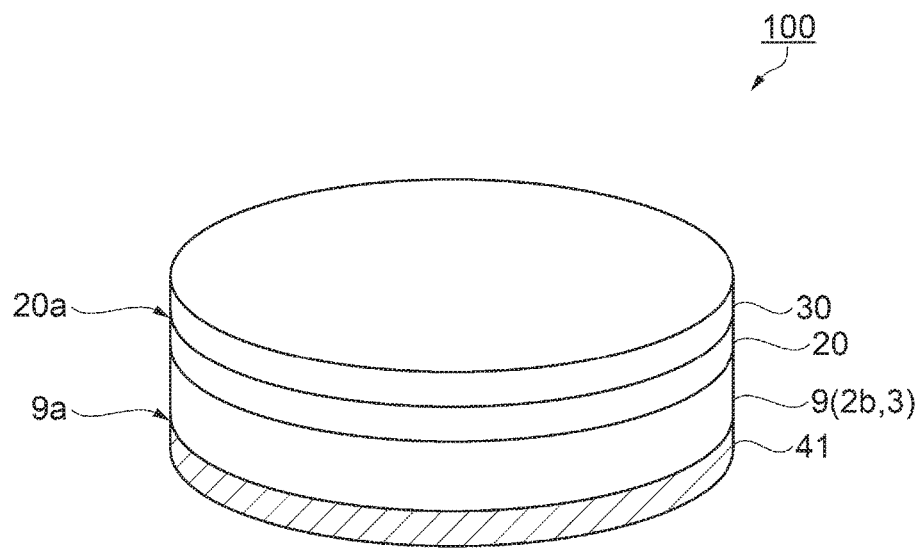
FIG. 1 is a schematic perspective view showing a structure of a lithium battery as a battery according to a first embodiment.

First, a battery according to this embodiment will be described with reference to FIG. 1. In this embodiment, a lithium battery will be described as an example of the battery. FIG. 1 is a schematic perspective view showing a structure of a lithium battery as the battery according to the first embodiment.

As shown in FIG. 1, a lithium battery 100 of this embodiment includes a positive electrode 9 as a composite body containing an electrolyte 3 and an active material 2b, a negative electrode 30 as an electrode provided on one side of the positive electrode 9 through an electrolyte section 20, and a first current collector 41 provided in contact with the other side of the positive electrode 9.

That is, the lithium battery 100 is a stacked body in which the first current collector 41, the positive electrode 9, the electrolyte section 20, and the negative electrode 30 are sequentially stacked. In the electrolyte section 20, a surface which is in contact with the negative electrode 30 is defined as "one surface 20a", and in the positive electrode 9, a surface which is in contact with the first current collector 41 is defined as "surface 9a". For the electrolyte section 20, a second current collector (not shown) may be provided as appropriate through the negative electrode 30, and the lithium battery 100 only needs to have a current collector which is in contact with at least one of the positive electrode 9 and the negative electrode 30.

Current Collector

For the first current collector 41 and the second current collector, any material can be suitably used as long as it is a forming material which does not cause an electrochemical reaction with the positive electrode 9 and the negative electrode 30, and has an electron conduction property. As the forming material of the first current collector 41 and the second current collector, for example, one type of metal (metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), or an alloy containing at least one type of metal element selected from the above-mentioned group, an electrically conductive metal oxide such as ITO (Tin-doped Indium Oxide), ATO (Antimony-doped Tin Oxide), or FTO (Fluorine-doped Tin Oxide), a metal nitride such as titanium nitride (TiN), zirconium nitride (ZrN), or tantalum nitride (TaN), or the like can be used.

As the form of the first current collector 41 and the second current collector, other than a thin film of the above-mentioned forming material having an electron conduction property, an appropriate form such as a metal foil, a plate, or a paste obtained by kneading an electrically conductive fine powder with a binder can be selected according to the intended purpose. The thickness of such a first current collector 41 and a second current collector is not particularly limited, but is, for example, about 20 µm. The formation of the first current collector 41 and the second current collector may be performed after forming the positive electrode 9, the negative electrode 30, etc., or may be performed before forming such members.

Negative Electrode

As a negative electrode active material (forming material) contained in the negative electrode 30, for example, niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), ITO (Indium Tin Oxide), ATO (Antimony-doped Tin Oxide), FTO (Fluorine-doped Tin Oxide), aluminum (Al)-doped zinc oxide (AZO), gallium (Ga)-doped zinc oxide (GZO), the anatase phase of $TiO_2$, a lithium composite oxide such as $Li_4Ti_5O_{12}$ or $Li_2Ti_3O_7$, a metal or an alloy such as lithium (Li), silicon (Si), tin (Sn), a silicon-manganese alloy (Si—Mn), a silicon-cobalt alloy (Si—Co), a silicon-nickel alloy (Si—Ni), indium (In), or gold (Au), a carbon material, a material obtained by intercalation of lithium ions between layers of a carbon material, or the like can be used.

The thickness of the negative electrode 30 is preferably from about 50 nm to 100 µm or so, but can be arbitrarily designed according to a desired battery capacity or material properties.

The lithium battery 100 has, for example, a circular disk shape, and the size of the outer shape thereof is such that the diameter is about 10 mm and the thickness is about 150 µm. In addition to being small and thin, the lithium battery 100 can be charged and discharged, and is capable of obtaining a large output energy, and therefore can be favorably used as a power supply source (power supply) for a portable information terminal or the like. The shape of the lithium battery 100 is not limited to a circular disk shape, and may be, for example, a polygonal disk shape. Such a thin lithium battery 100 may be used alone or a plurality of lithium batteries 100 may be stacked and used. In the case of stacking the lithium batteries 100, in the lithium battery 100, the first current collector 41 and the second current collector are not necessarily essential components, and a configuration in which one of the current collectors is included may be adopted.

Figure 2:
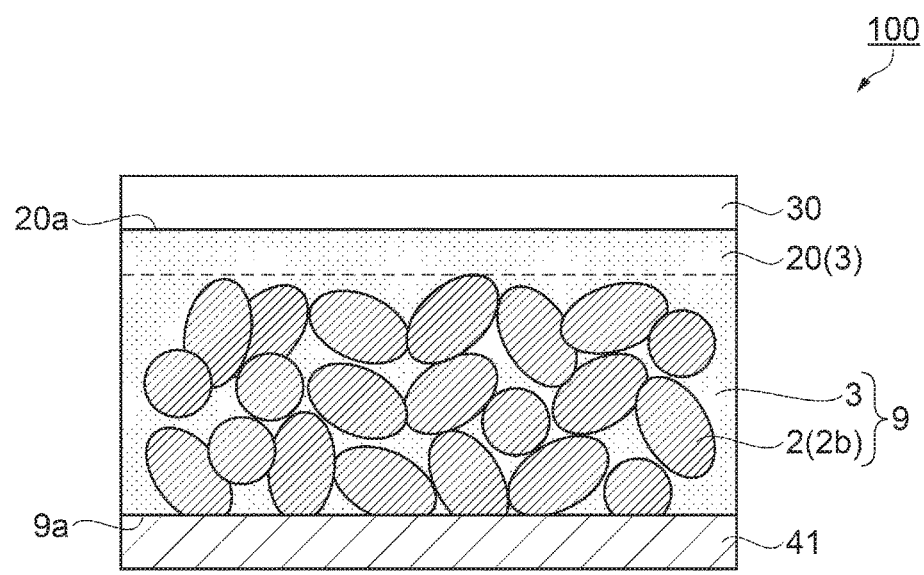
FIG. 2 is a schematic cross-sectional view showing a structure of the lithium battery.

Next, the structures of the positive electrode 9, the electrolyte section 20, and the like included in the lithium battery 100 will be described with reference to FIG. 2. FIG. 2 is a schematic cross-sectional view showing the structure of the lithium battery.

The electrolyte section 20 contains the electrolyte 3, and the positive electrode 9 contains the active material 2b and the electrolyte 3. The active material 2b is in a granular form, and a plurality of grains of the active material 2b gather to form an active material section 2 having a plurality of pores.

Positive Electrode

The plurality of pores of the active material section 2 in the positive electrode 9 communicate with one another like a mesh inside the active material section 2. Therefore, the contact between the active materials 2b is ensured. The electrolyte 3 is provided so as to fill up the plurality of pores of the active material section 2 and further cover the entire active material section 2. That is, the active material section 2 and the electrolyte 3 are combined to form a composite body (positive electrode 9). Therefore, as compared with the case where the active material section 2 does not have a plurality of pores or the case where the electrolyte 3 is not provided inside the pores, the contact area between the active material 2b and the electrolyte 3 becomes large. Due to this, the interface resistance is decreased, and it becomes possible to achieve favorable charge transfer at the interface between the active material section 2 and the electrolyte 3.

As in the lithium battery 100 of this embodiment, in the case where the first current collector 41 is used on the positive electrode 9 side, a lithium composite metal compound which is a positive electrode active material containing lithium (Li) is used as the active material 2b (active material section 2). FIG. 2 is a view schematically showing the active material 2b, and the grain diameter or the size thereof is not necessarily the same as the actual one.

The lithium composite metal compound to be used as the positive electrode active material refers to a compound such as an oxide, which contains lithium and also contains two or more types of metal elements as a whole, and in which the existence of oxoacid ions is not observed.

Examples of the lithium composite metal compound include composite metal compounds containing lithium (Li) and also containing at least one type of element selected from vanadium (V), chromium (Cr), manganese (Mn), iron (Fe), cobalt (Co), nickel (Ni), and copper (Cu). Such a composite metal compound is not particularly limited, however, specific examples thereof include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, $Li_2MnSiO_4$, $NMC(Li_a(Ni_xMn_yCo_{1-x-y})O_2)$, and $NCA(Li(Ni_xCo_yAl_{1-x-y})O_2)$. Further, in this embodiment, solid solutions obtained by substituting some of the atoms in a crystal of any of these lithium composite metal compounds with another transition metal, a typical metal, an alkali metal, an alkaline rare earth element, a lanthanoid, a chalcogenide, a halogen, or the like are also included in the lithium composite metal compound, and any of these solid solutions can also be used as the positive electrode active material.

By using the lithium composite metal compound as the active material 2b in the forming material of the active material section 2, electron transfer is performed between the grains of the active material 2b, and lithium ion transfer is performed between the active material 2b and the electrolyte 3. According to this, the function as the active material section 2 can be favorably exhibited.

The active material section 2 has a bulk density of preferably 50% or more and 90% or less, more preferably 50% or more and 70% or less. When the active material section 2 has such a bulk density, the surface area of the inside of the pore of the active material section 2 is enlarged, and the contact area between the active material section 2 and the electrolyte 3 is easily increased. According to this, in the lithium battery 100, it becomes easier to increase the capacity than in the related art.

When the above-mentioned bulk density is denoted by β (%), the apparent volume including the pores of the active material section 2 is denoted by v, the mass of the active material section 2 is denoted by w, and the density of the grains of the active material 2b is denoted by ρ, the following mathematical formula (1) is established. According to this, the bulk density can be determined.

$$\beta = \{w/(v \cdot \rho)\} \times 100 \quad (1)$$

In order to control the bulk density of the active material section 2 to fall within the above range, the average grain diameter (median diameter) of the active material 2b is set to preferably 0.3 μm or more and 10 μm or less, and it is more preferably 0.5 μm or more and 5 μm or less. The average grain diameter of the active material 2b can be measured by, for example, dispersing the active material 2b in n-octyl alcohol at a concentration within a range of 0.1 mass % or more and 10 mass % or less, and determining the median diameter using a light scattering grain size distribution analyzer, Nanotrac UPA-EX250 (Nikkiso Co., Ltd.).

The bulk density of the active material section 2 may also be controlled by using a pore forming material in the step of forming the active material section 2.

The resistivity of the active material section 2 is preferably 700 Ω·cm or less. When the active material section 2 has such a resistivity, a sufficient output can be obtained in the lithium battery 100. The resistivity can be determined by adhering a copper foil as an electrode to the surface of the active material section 2, and performing DC polarization measurement.

In the active material section 2, the plurality of pores communicate with one another like a mesh, and therefore, also the solid portion of the active material section 2 forms a mesh-like structure. For example, $LiCoO_2$, which is a positive electrode active material, is known to have anisotropy in the electron conduction property in a crystal. Due to this, in a structure in which pores extend in a specific direction such that the pores are formed by machining, the electron conduction property may be decreased depending on the direction of the electron conduction property in a crystal. On the other hand, in this embodiment, the active material section 2 has a mesh-like structure, and therefore, a continuous surface which is electrochemically active can be formed regardless of the anisotropy of the electron conduction property or ion conduction property in a crystal. Due to this, favorable electron conduction can be ensured regardless of the type of the forming material to be used.

In the positive electrode 9, the contained amount of the binder (binding agent) for binding the active materials 2b or the pore forming material for adjusting the bulk density of the active material section 2 is preferably reduced as much as possible. When the binder or the pore forming material remains in the active material section 2 (positive electrode 9), such a component may sometimes adversely affect the electrical characteristics, and therefore, it is necessary to remove the component by carefully performing heating in a post-process. Specifically, in this embodiment, the percentage loss in mass in the case where the positive electrode 9 is heated at 400° C. for 30 minutes is set to 5 mass % or less. The percentage loss in mass is preferably 3 mass % or less, more preferably 1 mass % or less, and further more preferably, the mass loss is not observed or is within the measurement error range. When the percentage loss in mass of the positive electrode 9 is within such a range, the amount of a solvent or adsorbed water which is evaporated, an organic substance which is vaporized by combustion or oxidation under a predetermined heating condition, or the like is reduced. According to this, the electrical characteristics (charge-discharge characteristics) of the lithium battery 100 can be further improved.

The mass loss percentage of the positive electrode 9 can be determined from the values of the mass of the positive electrode 9 before and after heating under a predetermined heating condition using a simultaneous thermogravimetric/differential thermal analyzer (TG-DTA).

In the lithium battery 100, a direction away from the first current collector 41 in the normal direction (the upper side of FIG. 2) is defined as "upward direction", the surface on the upper side of the positive electrode 9 is in contact with the electrolyte section 20. The surface 9a on the lower side of the positive electrode 9 is in contact with the first current collector 41. In the positive electrode 9, the upper side in contact with the electrolyte section 20 is "one side", and the lower side in contact with the first current collector 41 is "the other side".

On the surface 9a of the positive electrode 9, the active material section 2 is exposed. Therefore, the active material section 2 and the first current collector 41 are provided in contact with each other and both are electrically connected to each other. The electrolyte 3 is also provided inside the pores of the active material section 2 and is in contact with the surface of the active material section 2 including the inside of the pores of the active material section 2 other than the surface in contact with the first current collector 41. In the positive electrode 9 having such a configuration, due to the contact area between the first current collector 41 and the active material section 2, the contact area between the active material section 2 and the electrolyte 3 is increased. Because of this, the interface between the active material section 2 and the electrolyte 3 hardly becomes a bottleneck of charge transfer, and therefore, favorable charge transfer is easily ensured as the positive electrode 9, and thus, it is possible to achieve a high capacity and a high output in the lithium battery 100 using the positive electrode 9.

Electrolyte Section

The electrolyte section 20 is provided between the positive electrode 9 and the negative electrode 30 as described above. The electrolyte section 20 contains the electrolyte 3, but does not contain the active material 2b. In the electrolyte section 20, the same electrolyte 3 as in the positive electrode 9 described above can be used. By interposing the electrolyte section 20 which does not contain the active material 2b between the positive electrode 9 and the negative electrode 30, the positive electrode 9 and the negative electrode 30 are hardly electrically connected to each other, and the occurrence of a short circuit is suppressed. The positive electrode 9 and the electrolyte section 20 each contain the electrolyte 3, and therefore, the electrolytes 3 of both may be formed simultaneously at the time of production. That is, in the production step of the lithium battery 100, the formation of the active material section 2 and the formation of the electrolyte section 20 may be performed at one time. Further, the electrolyte section 20 may be formed using a different forming material from that of the electrolyte 3. In such a case, the positive electrode 9 and the electrolyte section 20 are formed in separate production steps.

The thickness of the electrolyte section 20 is preferably 0.1 μm or more and 100 μm or less, more preferably 0.2 μm or more and 10 μm or less. By setting the thickness of the electrolyte section 20 within the above range, the internal resistance of the electrolyte section 20 is decreased, and the occurrence of a short circuit between the positive electrode 9 and the negative electrode 30 can be suppressed.

On the one surface 20a (the surface in contact with the negative electrode 30) of the electrolyte section 20, a relief structure such as a trench, a grating, or a pillar may be provided by combining various molding methods and processing methods as needed.

Electrolyte

Figure 3:
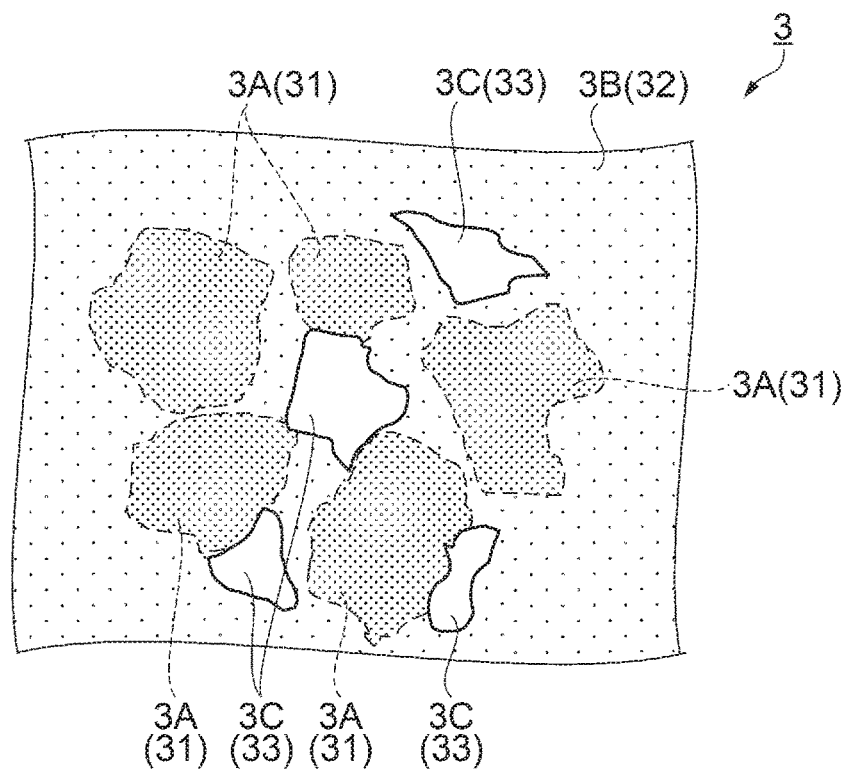
FIG. 3 is a schematic view showing a structure of a solid electrolyte.

Next, the structure of the electrolyte 3 will be described with reference to FIG. 3. FIG. 3 is a schematic view showing the structure of the electrolyte.

The electrolyte 3 includes a first electrolyte 31, in which at least one type of element among the elements constituting a crystalline lithium composite metal oxide represented by the following compositional formula (1) is substituted with a metal element having a crystal radius of 78 pm (picometers) or more, an amorphous second electrolyte 32, which contains lithium (Li) and one or more types of metal elements contained in the first electrolyte 31 other than lithium (Li), and an amorphous third electrolyte 33, which contains lithium (Li) and is in contact with the first electrolyte 31 and the second electrolyte 32.

(1)

In the formula (1), x and y satisfy the following formulae: $0.1 \leq x \leq 0.6$ and $0.0 < y \leq 0.3$.

Specifically, as shown in FIG. 3, the electrolyte 3 includes a first portion 3A including the first electrolyte 31, a second portion 3B including the second electrolyte 32, and a third portion 3C including the third electrolyte 33. The third portions 3C communicate with one another inside the electrolyte 3.

The structure of such an electrolyte 3 can be confirmed, for example, with a transmission electron microscope or the like. In the electrolyte 3 of this embodiment, the boundary between the first portion 3A and the second portion 3B is not always clear. The concentration of one or more types of metal elements contained in the first electrolyte 31 and the second electrolyte 32 continuously changes between the first portion 3A and the second portion 3B, and the concentration gradient of the metal elements is present. Therefore, the boundary between the first portion 3A and the second portion 3B is in an ambiguous state.

This concentration gradient is derived from a difference in ease of entry of a metal element having a crystal radius of 78 pm or more into the crystal lattice in the crystalline lithium composite metal oxide of the above compositional formula (1). That is, from the first electrolyte 31 to the second electrolyte 32, the concentration of a metal element whose ease of entry described above is high gradually decreases, and the concentration of a metal element whose ease of entry described above is low gradually increases. Therefore, in order to generate such a concentration gradient, two or more types of metal elements having a crystal radius of 78 pm or more are used when forming the first electrolyte 31 and the second electrolyte 32.

FIG. 3 is a view schematically illustrating a state by observation of the structure using a transmission electron microscope for the structure of such an electrolyte 3, and does not necessarily coincide with the actual state.

Here, in the lithium battery 100 of this embodiment, the third electrolyte 33 is not necessarily essential. That is, the electrolyte 3 may be formed from the first electrolyte 31 and the second electrolyte 32 without using the third electrolyte 33.

The first electrolyte 31 preferably contains a crystalline lithium composite metal oxide represented by the following compositional formula (2), in which zirconium (Zr) in the lithium composite metal oxide represented by the above compositional formula (1) is partially substituted with a metal element having a crystal radius of 78 pm or more. According to this, an excellent lithium ion conduction property can be exhibited.

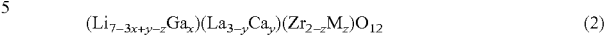
(2)

In the formula (2), x, y, and z satisfy the following formulae: $0.1 \leq x \leq 0.6$, $0.0 < y \leq 0.3$, and $0.1 \leq z \leq 0.6$, and M represents a metal element having a crystal radius of 78 pm or more.

Examples of the metal element having a crystal radius of 78 pm or more include magnesium (Mg), scandium (Sc), strontium (Sr), yttrium (Y), niobium (Nb), molybdenum (Mo), indium (In), antimony (Sb), tellurium (Te), barium (Ba), cerium (Ce), praseodymium (Pr), neodymium (Nd), hafnium (Hf), tantalum (Ta), lead (Pb), and bismuth (Bi). Among these, the first electrolyte preferably contains one or more types among niobium (Nb), antimony (Sb), and tantalum (Ta), each of which is easily substituted for zirconium (Zr), has an excellent effect of improving the lithium ion conduction property, etc. As for the crystal radius of each of these elements, according to a crystal and molecular structure design program, CrystalMaker (registered trademark) (Hulinks, Inc.), the crystal radius of niobium (Nb) is 78 pm, the crystal radius of antimony (Sb) is 90 pm, and the crystal radius of tantalum (Ta) is 78 pm. Other than these, a metal element capable of forming a garnet-type crystal or a garnet-like-type crystal may be used.

The second electrolyte 32 is an amorphous material formed using the lithium composite metal oxide contained in the first electrolyte 31 described above, and contains one or more types among niobium (Nb), antimony (Sb), and tantalum (Ta) each of which is a metal element having a crystal radium of 78 pm or more, and lithium (Li), lanthanum (La), and zirconium (Zr).

As the forming material of the third electrolyte 33, a solid electrolyte having a lower melting point than the melting point of the active material 2b, the first electrolyte 31, and the second electrolyte 32 may be used. Specific examples thereof include oxides, halides, hydrides, and borides such as LiBH$_4$ (268° C.), LiF (848° C.), LiCl (605° C.), LiBr (552° C.), LiI (469° C.), Li$_3$BO$_3$ (817° C.), and Li$_{2+x}$C$_{1-x}$B$_x$O$_3$ (0.01<x<0.5) (680° C. to 750° C.), and amorphous and partially crystallized glasses of partially substituted materials thereof. The temperatures in brackets attached to the above-mentioned compound names are the melting points of the compounds. Among these, it is preferred to use a solid electrolyte containing Li, B, and O, and it is more preferred to use a solid electrolyte containing Li, B, C, and O. According to this, the amorphous third electrolyte is easily formed, and the lithium ion conduction property of the electrolyte can be further more improved.

Further, a solid solution obtained by substituting some of the atoms of any of the above-mentioned compounds with another transition metal, a typical metal, an alkali metal, an alkaline rare earth element, a lanthanoid, a chalcogenide, a halogen, or the like may also be used as the forming material of the third electrolyte 33. Among the above-mentioned solid electrolytes, one type may be used alone or two or more types may be mixed and used.

Among the above-mentioned compounds, as the third electrolyte 33, it is preferred to use a solid electrolyte containing lithium (Li), boron (B), carbon (C), and oxygen (O). In this embodiment, as the forming material of the third electrolyte 33, Li$_{2+x}$C$_{1-x}$B$_x$O$_3$ (0.01<x<0.5) is used. Specific examples thereof include Li$_{2.2}$C$_{0.8}$B$_{0.2}$O$_3$. By using the above-mentioned forming material in the third electrolyte 33, the occurrence of dendrite due to segregation of lithium is suppressed, and a composite body (positive electrode 9) having a dense structure is formed. According to this, the lithium ion conduction property in the positive electrode 9 can be further improved.

The total ion conductivity as the index of the lithium ion conduction property of the electrolyte 3 is preferably 2.0× $10^{-4}$ S/cm or more. When the electrolyte 3 has such an ion conductivity, an ion contained in the electrolyte 3 at a position away from the surface of the active material section 2 easily reaches the surface of the active material section 2. Due to this, also the ion can contribute to the battery reaction in the active material section 2, and the capacity of the lithium battery 100 can be further increased.

Here, the ion conductivity of the electrolyte 3 refers to a grain bulk conductivity as the conductivity of the electrolyte 3 itself, and in the case where the electrolyte 3 is a crystalline material, a grain boundary conductivity as the conductivity between crystal grains, and a total ion conductivity which is the sum of these conductivities. Further, the index of the grain boundary resistance in the electrolyte 3 is a grain boundary conductivity, and when the grain boundary conductivity increases, the grain boundary resistance decreases. The measurement method for the ion conductivity of the electrolyte 3 will be described later.

Method for Producing Battery

Figure 4:
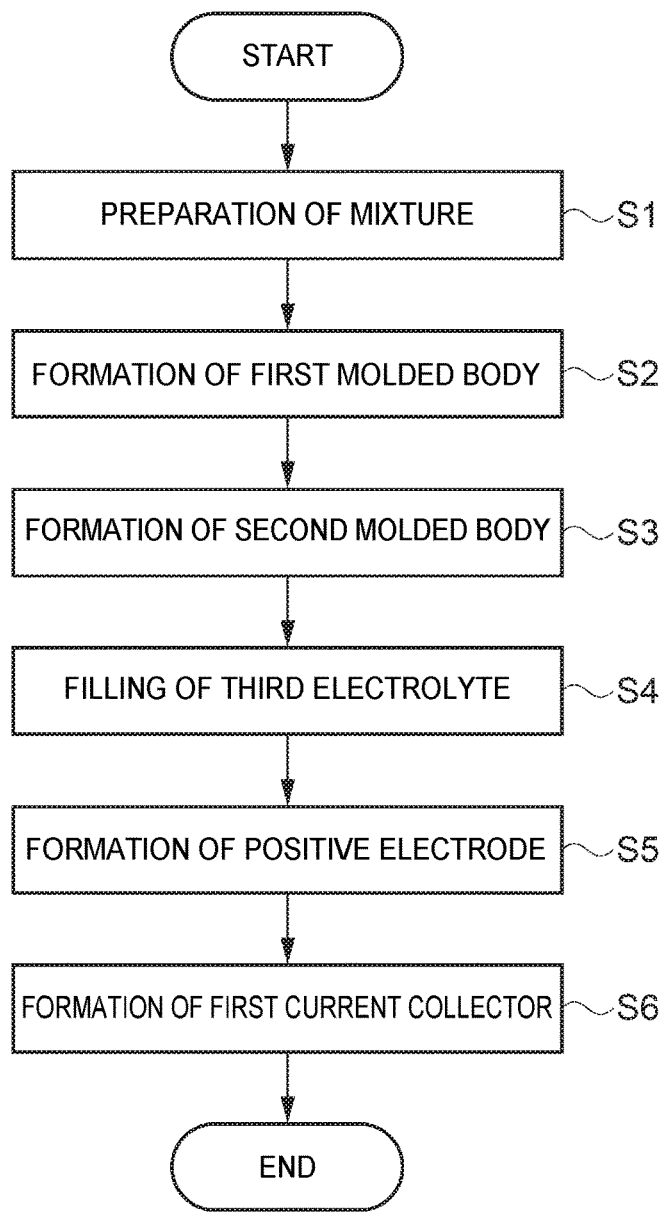
FIG. 4 is a process flowchart showing a method for producing the lithium battery.

A method for producing the lithium battery 100 as the battery according to this embodiment will be described with reference to FIG. 4. FIG. 4 is a process flowchart showing a method for producing the lithium battery. The process flow shown in FIG. 4 is an example, and the method is not limited thereto.

The method for producing the lithium battery 100 of this embodiment includes a step S1 of dissolving a plurality of types of raw materials containing the elements constituting a crystalline lithium composite metal oxide represented by the following compositional formula (1) and a metal element having a crystal radius of 78 pm or more, respectively, in a solvent, followed by mixing, thereby preparing a mixture, a step S2 of forming an active material section 2 as a first molded body using an active material 2b, a step S3 of subjecting the mixture to a heating treatment in a state of being impregnated into the active material section 2 to cause a reaction, thereby forming a second molded body containing a crystalline first electrolyte 31 and an amorphous second electrolyte 32 obtained after the reaction, and the active material section 2, a step S4 of melting a third electrolyte 33 containing lithium (Li), boron (B), carbon (C), and oxygen (O) by heating in a state where the third electrolyte 33 is brought into contact with the second molded body, thereby filling the second molded body with the melt of the third electrolyte 33, a step S5 of cooling the second molded body filled with the melt of the third electrolyte 33, thereby forming a positive electrode 9 which contains the first electrolyte 31, the second electrolyte 32, the third electrolyte 33, and the active material section 2 (active material 2b), and a step S6 of forming a first current collector 41 on the positive electrode 9.

$$(Li_{7-3x+y}Ga_x)(La_{3-y}Ca_y)Zr_2O_{12} \quad (1)$$

In the formula (1), x and y satisfy the following formulae: 0.1≤x≤0.6 and 0.0<y≤0.3.

Here, the method for producing the lithium battery 100 includes a method for producing the first electrolyte 31 and the second electrolyte 32 of the electrolyte 3 of this embodiment. That is, the method for producing the first electrolyte 31 and the second electrolyte 32 of this embodiment includes a step of mixing a plurality of types of raw materials containing the elements constituting a crystalline lithium composite metal oxide represented by the above compositional formula (1) and a metal element having a crystal radius of 78 pm or more, respectively, thereby preparing a mixture, and a step of subjecting the mixture to a heating treatment, thereby forming the crystalline first electrolyte 31 and the amorphous second electrolyte 32. These steps are included in the step S1 and the step S3 in the method for producing the lithium battery 100 described above. The method for producing the first electrolyte 31 and the second electrolyte 32 of this embodiment will be described by exemplifying a liquid phase method.

Preparation of Mixture

In the step S1 shown in FIG. 4, solutions are prepared by dissolving precursors as the raw materials of the first electrolyte 31 and the second electrolyte 32 in a solvent, followed by mixing these solutions, whereby a mixture is prepared. That is, the mixture contains a solvent for dissolving the above-mentioned raw materials (precursors). As the precursors of the first electrolyte 31 and the second electrolyte 32, metal compounds containing the elements constituting the lithium composite metal oxide represented by the above compositional formula (1) and a metal compound containing a metal element having a crystal radius of 78 pm or more are used.

As the metal compounds containing the elements constituting the lithium composite metal oxide represented by the above compositional formula (1), a lithium compound, a lanthanum compound, a zirconium compound, a gallium compound, and a calcium compound are used. The type of these compounds is not particularly limited, but is preferably at least one type of metal salt or metal alkoxide of each of lithium, lanthanum, zirconium, gallium, and calcium.

Examples of the lithium compound include lithium metal salts such as lithium chloride, lithium nitrate, lithium acetate, lithium hydroxide, and lithium carbonate, and lithium alkoxides such as lithiummethoxide, lithium ethoxide, lithium propoxide, lithium isopropoxide, lithium n-butoxide, lithium isobutoxide, lithium sec-butoxide, lithium tert-butoxide, and lithium dipivaloylmethanate, and at least one type selected from this group can be adopted.

Examples of the lanthanum compound include lanthanum metal salts such as lanthanum chloride, lanthanum nitrate, and lanthanum acetate, and lanthanum alkoxides such as lanthanum trimethoxide, lanthanum triethoxide, lanthanum tripropoxide, lanthanum triisopropoxide, lanthanum tri-n-butoxide, lanthanum triisobutoxide, lanthanum tri-sec-butoxide, lanthanum tri-tert-butoxide, and lanthanum tris (dipivaloylmethanate), and at least one type selected from this group can be adopted.

Examples of the zirconium compound include zirconium metal salts such as zirconium chloride, zirconium oxychloride, zirconium oxynitrate, zirconium oxyacetate, and zirconium acetate, and zirconium alkoxides such as zirconium tetramethoxide, zirconium tetraethoxide, zirconium tetrapropoxide, zirconium tetraisopropoxide, zirconium tetra-n-butoxide, zirconium tetraisobutoxide, zirconium tetra-sec-butoxide, zirconium tetra-tert-butoxide, and zirconium tetrakis(dipivaloylmethanate), and at least one type selected from this group can be adopted.

Examples of the gallium compound include gallium metal salts such as gallium bromide, gallium chloride, gallium iodide, and gallium nitrate, and gallium alkoxides such as gallium trimethoxide, gallium triethoxide, gallium tri-n- propoxide, gallium triisopropoxide, and gallium tri-n-butoxide, and at least one type selected from this group can be adopted.

Examples of the calcium compound include calcium metal salts such as calcium bromide, calcium chloride, calcium fluoride, calcium iodide, calcium nitrate, calcium oxalate, and calcium acetate, and calcium alkoxides such as calcium dimethoxide, calcium diethoxide, calcium diisopropoxide, calcium di-n-propoxide, calcium diisobutoxide, calcium di-n-butoxide, and calcium di-sec-butoxide, and at least one type selected from this group can be adopted.

As the metal compound containing a metal element having a crystal radius of 78 pm or more, a niobium compound, an antimony compound, a tantalum compound, or the like is used. The type of these compounds is not particularly limited, but is preferably at least one type of metal salt or metal alkoxide of each of niobium, antimony, tantalum, and the like.

Examples of the niobium compound include niobium metal salts such as niobium chloride, niobium oxychloride, niobium oxalate, niobium triacetylacetonate, and niobium pentaacetylacetonate, and niobium alkoxides such as niobium pentaethoxide, niobium pentapropoxide, niobium pentaisopropoxide, and niobium penta-sec-butoxide, and at least one type selected from this group can be adopted.

Examples of the antimony compound include antimony metal salts such as antimony bromide, antimony chloride, and antimony fluoride, and antimony alkoxides such as antimony trimethoxide, antimony triethoxide, antimony triisopropoxide, antimony tri-n-propoxide, antimony triisobutoxide, and antimony tri-n-butoxide, and at least one type selected from this group can be adopted.

Examples of the tantalum compound include tantalum metal salts such as tantalum chloride and tantalum bromide, and tantalum alkoxides such as tantalum pentamethoxide, tantalum pentaethoxide, tantalum pentaisopropoxide, tantalum penta-n-propoxide, tantalum pentaisobutoxide, tantalum penta-n-butoxide, tantalum penta-sec-butoxide, and tantalum penta-tert-butoxide, and at least one type selected from this group can be adopted.

As the solvent contained in the solution which contains the precursors of the first electrolyte 31 and the second electrolyte 32, a single solvent of water or an organic solvent or a mixed solvent capable of dissolving the above-mentioned metal salt or metal alkoxide is used. The organic solvent is not particularly limited, however, examples thereof include alcohols such as methyl alcohol, ethyl alcohol, n-propyl alcohol, isopropyl alcohol, n-butyl alcohol, allyl alcohol, and ethylene glycol monobutyl ether (2-n-butoxyethanol), glycols such as ethylene glycol, propylene glycol, butylene glycol, hexylene glycol, pentanediol, hexanediol, heptanediol, and dipropylene glycol, ketones such as dimethyl ketone, methyl ethyl ketone, methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether, organic acids such as formic acid, acetic acid, 2-ethylbutyric acid, and propionic acid, aromatics such as toluene, o-xylene, and p-xylene, and amides such as formamide, N,N-dimethylformamide, N,N-diethylformamide, dimethylacetamide, and N-methylpyrrolidone.

The precursors of the first electrolyte 31 and the second electrolyte 32 described above are dissolved in the above-mentioned solvent, whereby a plurality of solutions containing each of the precursors of the first electrolyte 31 and the second electrolyte 32 are prepared. Subsequently, a mixture is prepared by mixing the plurality of solutions. At this time, in addition to lithium, lanthanum, zirconium, gallium, and calcium, at least one type among niobium, antimony, and tantalum is incorporated in the mixture at a predetermined ratio according to the composition of the first electrolyte 31 and the second electrolyte 32. At this time, the mixture may be prepared by mixing the precursors, and then dissolving the mixture in a solvent without preparing the plurality of solutions containing each of the precursors.

Lithium in the composition is sometimes volatilized by heating in a post-process. Therefore, the lithium compound may be blended excessively in advance so as to increase the content of the lithium compound in the mixture by about 0.05 mass % to 20 mass % with respect to the desired composition according to the heating condition.

Formation of First Molded Body

In the step S2, the active material section 2 as the first molded body is formed. In this embodiment, as the forming material (active material 2b) of the active material section 2, $LiCoO_2$ which is a lithium composite metal compound is used. First, the grains of $LiCoO_2$ (Sigma-Aldrich Co., Ltd.) is subjected to a classification operation in n-butanol using a wet-type centrifuge model LC-1000 (Krettek Separation GmbH), whereby the active material 2b having an average grain diameter of about 5 μm is obtained. Subsequently, the active material 2b is compression-molded using a molding die. $LiCoO_2$ powder is pressed at a pressure of 624 MPa for 2 minutes using a molding die (a die with an exhaust port having an inner diameter of 10 mm), whereby a disk-shaped molded material (diameter: 10 mm, effective diameter: 8 mm, thickness: 150 μm) of $LiCoO_2$ (active material 2b) is produced.

Thereafter, the molded material of the active material 2b is placed on a substrate and is subjected to a heat treatment at 900° C. for 8 hours, whereby the active material section 2 is obtained. By this heating treatment, the grains of the active material 2b are sintered to one another, and the shape of the molded material is easily retained. Further, the active materials 2b are brought into contact with each other and bound to each other, whereby an electron transfer pathway is formed. The forming material of the substrate is not particularly limited, however, it is preferred to use a material which is less likely to react with the active material 2b and the electrolyte 3.

The temperature of the heat treatment is preferably, for example, a temperature which is 850° C. or higher and is lower than the melting point of the active material 2b. According to this, the active materials 2b are sintered to one another, whereby an integrated porous body is obtained. By setting the temperature of the heat treatment to 850° C. or higher, sintering proceeds sufficiently, and also the electron conduction property in the crystal of the active material 2b is ensured. By setting the temperature of the heat treatment lower than the melting point of the active material 2b, excessive volatilization of lithium ions in the crystal of the active material 2b is suppressed, and the lithium ion conduction property is maintained. Due to this, it becomes possible to ensure the electrical capacity of the positive electrode 9. The temperature of the heat treatment is more preferably 875° C. or higher and 1000° C. or lower. According to this, in the lithium battery 100 using the positive electrode 9, appropriate output and capacity can be provided.

The time of the heat treatment is preferably set to, for example, 5 minutes or more and 36 hours or less, and it is more preferably 4 hours or more and 14 hours or less. By the above-mentioned treatment, the active material section 2 having a plurality of pores is obtained.

Formation of Second Molded Body

In the step S3, the mixture prepared in the step S1 is brought into contact with and impregnated into the active material section 2, and then, a heating treatment is performed. By the reaction of the mixture, the crystalline first electrolyte 31 and the amorphous second electrolyte 32 are formed. In this manner, the first electrolyte 31 and the second electrolyte 32 are formed on the surface including the inside of the plurality of pores of the active material section 2, whereby the second molded body is obtained.

First, the mixture and the active material section 2 are brought into contact with each other and the mixture is impregnated into the active material section 2. Specifically, the mixture is applied to the surface of the active material section 2 including the inside of the pores of the active material section 2 using a micropipette or the like. At this time, the application amount of the mixture is adjusted so that the bulk density of the produced second molded body is approximately about 75% or more and 85% or less. In other words, the application amount of the mixture is adjusted so that about half the volume of the voids (pores) of the active material section 2 is filled with the first electrolyte 31 and the second electrolyte 32. The bulk density of the second molded body can be obtained in the same manner as the bulk density of the active material section 2 described above.

As the method for applying the mixture, other than dropping using the micropipette, for example, a method such as immersion, spraying, penetration by capillary phenomenon, or spin coating can be used, and these methods may be performed in combination. The mixture has fluidity, and therefore also easily reaches the inside of the pores of the active material section 2, and the mixture is applied so as to wet and spread on the entire surface including the inside of the pores of the active material section 2.

In the case where the electrolyte section 20 is formed from the same forming material as that of the electrolyte 3, the mixture may be excessively applied to one surface of the active material section 2. By performing the below-mentioned heating treatment in this state, the active material section 2 is completely sunk in the first electrolyte 31 and the second electrolyte 32, and the electrolyte section 20 is formed.

Subsequently, the mixture impregnated into the active material section 2 is subjected to a heating treatment. The heating treatment includes a first heating treatment in which the heating temperature is 500° C. or higher and 650° C. or lower, and a second heating treatment which is performed after the first heating treatment, and in which the heating temperature is 800° C. or higher and 950° C. or lower. By the first heating treatment, a solvent contained in the mixture or an organic substance such as an impurity is decomposed and reduced. Therefore, in the second heating treatment, the purity is increased to accelerate the reaction, and the first electrolyte 31 and the second electrolyte 32 can be formed. Further, by setting the temperature of the heating treatment lower than 1000° C., volatilization of lithium can be suppressed. Accordingly, the lithium ion conduction property can be further improved. The heating treatment may be performed in a dry atmosphere, an oxidizing atmosphere, an inert gas atmosphere, or the like. As a heating treatment method, for example, the heating treatment is performed using an electric muffle furnace or the like.

Subsequently, the mixture is gradually cooled to room temperature after the heating treatment. The reaction in the mixture proceeds by the heating treatment, and by the cooling thereafter, the crystalline first electrolyte 31 containing the lithium composite metal oxide, in which zirconium is partially substituted with at least one of niobium, antimony, and tantalum, and which is represented by the above compositional formula (2), and the second electrolyte 32 are formed. That is, as the formation of the crystalline first electrolyte 31, the amorphous second electrolyte 32 is formed from the residue which did not contribute to the formation of the first electrolyte 31.

At this time, with respect to the lithium composite metal oxide represented by the above compositional formula (2), there is a difference in ease of entry into the crystal lattice among niobium, antimony, and tantalum. Due to this difference, the concentration gradient of niobium, antimony, and tantalum occurs at the boundary between the first portion 3A and the second portion 3B (see FIG. 3 for both) described above. That is, on the first portion 3A side, the concentration of a metal element which is more likely to enter the crystal lattice is high, and on the second portion 3B side, the concentration of a metal element which is less likely to enter the crystal lattice is high.

Among niobium, antimony, and tantalum, niobium has the highest ease of entry into the crystal lattice (niobium is most likely to enter), and antimony has the second highest ease of entry into the crystal lattice, and tantalum is the least likely to enter the crystal lattice. For example, in the case where two types: niobium and antimony are used when the first electrolyte 31 and the second electrolyte 32 are formed, in the first portion 3A (first electrolyte 31), the concentration of niobium is high, but on the contrary, in the second portion 3B (second electrolyte 32), the concentration of antimony is high. In the case of antimony and tantalum, in the first portion 3A, the concentration of antimony is high, and in the second portion 3B, the concentration of tantalum is high. Further, in the case where three types: niobium, antimony, and tantalum are used, in the first portion 3A (first electrolyte 31), the concentration of niobium is high, but on the contrary, in the second portion 3B (second electrolyte 32), the concentrations of antimony and tantalum are high.

Such ease of entry into the crystal lattice depends on the size of the crystal radius and the magnitude of penetration energy in the zirconium site of a metal element. Therefore, in order to form the crystalline first electrolyte 31 and the amorphous second electrolyte 32 in a state where the boundary therebetween is ambiguous, metal compounds each containing at least two types of metal elements each having a crystal radius of 78 pm or more and also having a mutually different penetration energy in the zirconium site are used.

Accordingly, the second molded body in which the active material section 2, the first electrolyte 31, and the second electrolyte 32 are combined is obtained. The second molded body has a bulk density of approximately about 75% or more and 85% or less and has a plurality of pores. In this embodiment, the first electrolyte 31 and the second electrolyte 32 are formed using a liquid phase method, however, the method is not limited thereto. The first electrolyte 31, the second electrolyte 32, and the like may be formed using a solid phase method.

Filling of Third Electrolyte

In the step S4, the melt of the third electrolyte 33 is filled in the pores of the second molded body. In this embodiment, as the third electrolyte 33, $Li_{2.2}C_{0.8}B_{0.2}O_3$ (hereinafter also referred to as "LCBO") is used. First, the grains (powder) of LCBO are produced. Specifically, for example, $Li_2CO_3$ and $Li_3BO_3$ are mixed at a mass mixing ratio of 4:1, and the resulting mixture is pressed into a tablet at a pressure of 30

MPa for 2 minutes using the same molding die as used in the step S2. Thereafter, the tablet is placed in a high-temperature furnace and fired at 650° C. for 4 hours, whereby a solid material of LCBO is produced. This solid material is ground using a dry mill or the like, whereby LCBO grains (the grains of the third electrolyte 33) in a powdery form are obtained.

Here, the melting point of the produced LCBO grains was measured using Simultaneous TG-DTA/DSC apparatus STA 8000 (PerkinElmer Co., Ltd.), and as a result, it was about 685° C. The method for producing the third electrolyte 33 in a granular form is not limited to the above-mentioned method, and a known method can be adopted.

Subsequently, the third electrolyte 33 in a granular form is placed on the upper surface (ceiling surface) of the second molded body, and heated. The mass of the third electrolyte 33 to be placed is preferably set not less than a mass which is sufficient for filling up the plurality of pores of the second molded body. In this state, the third electrolyte 33 in a granular form alone or the entire system including the third electrolyte 33 in a granular form and the active material section 2 is heated.

The heating temperature at this time may be arbitrarily set without being limited to the above-mentioned numerical values as long as it is higher than the melting point of the third electrolyte 33 and lower than the melting point of the first electrolyte 31. In this embodiment, the heating temperature is set to 700° C. As a heating method, laser annealing, an electric muffle furnace, or the like can be used. A molded pellet may be produced from the third electrolyte 33 in a granular form, and this molded pellet may be placed on the second molded body and then heated.

The third electrolyte 33 is melted into a melt by being heated to a temperature higher than the melting point thereof. The melt covers the entire second molded body while penetrating into the inside of the pores of the second molded body from the upper surface thereof. At this time, it is possible to form the electrolyte section 20 simultaneously with the positive electrode 9 by defining a surface under which the active material section 2 is completely sunk in the first electrolyte 31 and the second electrolyte 32 in the second molded body as the upper surface, and adjusting the mass of the third electrolyte 33 to be placed thereon.

Here, the method for filling the third electrolyte 33 in the second molded body is not limited to the above-mentioned method in which the melt of the third electrolyte 33 is penetrated. Examples of other forming methods include immersion, dropping, spraying, penetration by capillary phenomenon, and spin coating using a solution containing the precursor of the third electrolyte 33, and by performing heating in a post-process, removal of the solvent in the solution and firing of the third electrolyte 33 may be performed.

Formation of Positive Electrode

In the step S5, the melt of the third electrolyte 33 and the second molded body are allowed to cool, whereby the melt of the third electrolyte 33 is solidified. At this time, the third electrolyte 33 is solidified in a state where the third electrolyte 33 is in contact with the first electrolyte 31 and the second electrolyte 32 provided on the surface of the active material section 2 in the second molded body. In this manner, the positive electrode 9 in which the active material section 2, the first electrolyte 31, the second electrolyte 32, and the third electrolyte 33 are combined is formed.

The electrolyte 3 may be formed from the first electrolyte 31 to the second electrolyte 32 without using the third electrolyte 33. In such a case, the voids of the second molded body are filled by repeatedly performing the step S2.

Formation of First Current Collector

In the step S6, first, the surface (lower surface) facing the surface (upper surface) on which the electrolyte section 20 of the positive electrode 9 is formed is polished. At this time, by a polishing process, the active material section 2 is reliably exposed to form the surface 9a. By doing this, electrical connection between the active material section 2 and the first current collector 41 to be formed thereafter can be ensured. In the case where the active material section 2 is sufficiently exposed on the lower surface side of the positive electrode 9 in the above-mentioned step, this polishing process may be omitted.

Subsequently, the first current collector 41 is formed on the surface 9a. As a method for forming the first current collector 41, an appropriate method, for example, a method in which an appropriate adhesive layer is separately provided to adhere the first current collector 41, a gas-phase deposition method such as a PVD (Physical Vapor Deposition) method, a CVD (Chemical Vapor Deposition) method, a PLD (Pulsed Laser Deposition) method, an ALD (Atomic Layer Deposition) method, or an aerosol deposition method, a wet method such as a sol-gel method, an organometallic thermal decomposition method, or plating, or the like can be used according to the reactivity with the surface on which the first current collector 41 is formed, an electrical conduction property desired for the electrical circuit, and the design of the electrical circuit. Further, as the forming material of the first current collector 41, the above-mentioned forming material can be adopted.

Subsequently, the negative electrode 30 is formed on the one surface 20a side of the electrolyte section 20. As a method for forming the negative electrode 30, other than a solution process such as a so-called sol-gel method or an organometallic thermal decomposition method involving a hydrolysis reaction or the like of an organometallic compound, a CVD method using an appropriate metal compound and a gas atmosphere, an ALD method, a green sheet method or a screen printing method using a slurry of solid electrolyte grains, an aerosol deposition method, a sputtering method using an appropriate target and a gas atmosphere, a PLD method, a vacuum deposition method, plating, thermal spraying, or the like can be used. As the forming material of the negative electrode 30, the above-mentioned negative electrode active material can be adopted, and in this embodiment, lithium (Li) metal is used. By undergoing the above-mentioned steps, the lithium battery 100 is produced.

As described above, by the electrolyte 3, the method for producing the electrolyte 3, the lithium battery 100, and the method for producing the lithium battery 100 according to the above-mentioned embodiment, the following effects can be obtained.

According to the electrolyte 3, the crystalline first electrolyte 31 and the amorphous second electrolyte 32 are included, and therefore, as compared with the case where the electrolyte 3 is constituted by only a crystalline material and the first electrolytes 31 are bonded to each other, a resistance occurring at the crystal interface of the first electrolyte 31 is decreased. Moreover, even if firing is performed at a low temperature as in the related art, the stabilization of the crystal (cubic crystal) in the first electrolyte 31 is promoted, and therefore, the lithium ion conduction property of the electrolyte 3 can be improved.

The first electrolyte 31 is a crystalline lithium composite metal oxide having the above compositional formula (1) as a basic structure, and by using such a garnet-type crystal or a garnet-like-type crystal as the first electrolyte 31, the bulk lithium ion conductivity (grain bulk conductivity) can be improved in the electrolyte 3. In addition, a reducing reaction by lithium metal hardly occurs, and therefore, the stability of the electrolyte 3 can also be improved.

Zirconium (Zr) of the first electrolyte 31 is partially substituted with one or more types of metal elements among niobium (Nb), antimony (Sb), and tantalum (Ta), and therefore, the concentration gradient of one or more types of metal elements among niobium (Nb), antimony (Sb), and tantalum (Ta) occurs from the first electrolyte 31 to the second electrolyte 32.

That is, from the first electrolyte 31 to the second electrolyte 32, the concentration of a metal element whose ease of entry into the crystal lattice is high gradually decreases, and the concentration of a metal element whose ease of entry described above is low gradually increases. According to this configuration, the boundary between the first electrolyte 31 and the second electrolyte 32 gets into an ambiguous state. Therefore, as compared with the case where the boundary is clear, the grain boundary resistance is decreased, and the lithium ion conduction property can be further improved. Further, the metal element having a crystal radius of 78 pm or more such as niobium (Nb), antimony (Sb), or tantalum (Ta) hardly comes out of the first electrolyte 31 even by firing at a relatively high temperature, and stable lithium ion conduction property can be obtained.

By using the third electrolyte 33, the first electrolyte 31 is bonded to the second electrolyte 32 and the third electrolyte 33, and therefore, the resistance occurring at the crystal interface of the first electrolyte 31 is further decreased. Moreover, the lithium ion conduction property of the electrolyte 3 can be further improved. In addition, by using LCBO as the forming material of the third electrolyte 33, the amorphous third electrolyte 33 is easily formed.

According to the method for producing the electrolyte 3 or the lithium battery 100, the first electrolyte 31 and the second electrolyte 32 can be formed in the same step. Specifically, the amorphous second electrolyte 32 is formed in a state of being bonded to the first electrolyte 31 from the raw materials which do not contribute to the formation of the crystalline first electrolyte 31. Accordingly, the concentration gradient of the metal element occurs between the first electrolyte 31 and the second electrolyte 32, and the boundary between the first electrolyte 31 and the second electrolyte 32 becomes ambiguous. Further, the first electrolyte 31 and the second electrolyte 32 are formed in the same step, and therefore, the production step of the electrolyte 3 or the lithium battery 100 can be simplified.

Since a liquid phase method is used, the crystal grain of the first electrolyte 31 is crystallized from the solution of the mixture. Therefore, as compared with a solid phase method, the micronization of the crystal grain is facilitated. Further, by the first heating treatment (500° C. or higher and 650° C. or lower), a solvent contained in the mixture or an organic substance such as an impurity is decomposed and reduced. Therefore, in the second heating treatment (800° C. or higher and 950° C. or lower), the purity is increased to accelerate the reaction, and the first electrolyte 31 and the second electrolyte 32 can be formed. Further, by setting the temperature of the heating treatment lower than 1000° C., volatilization of lithium can be suppressed. Accordingly, the electrolyte 3 or the lithium battery 100 having a further improved lithium ion conduction property can be produced.

In the inside of the pores including the surface of the first molded body containing the active material section 2 (active material 2b), the first electrolyte 31 and the second electrolyte 32 are formed by a liquid phase method, whereby the second molded body is produced. Further, in the inside of the pores including the surface of the second molded body, the melt of the third electrolyte 33 is filled, whereby the positive electrode 9 is formed. Therefore, the active material section 2 is in contact with the first electrolyte 31 and the second electrolyte 32, and thus, the positive electrode 9 is formed such that the first electrolyte 31, the second electrolyte 32, and the third electrolyte 33 are in contact with one another. The positive electrode 9 having such a configuration can be easily produced, and also the grain boundary resistance of the electrolyte 3 can be decreased by the configuration.

According to the lithium battery 100, the electrolyte 3 having a decreased grain boundary resistance and an improved lithium ion conduction property is used, and therefore, the charge-discharge characteristics of the lithium battery 100 can be improved. Further, as the active material 2b, a positive electrode active material containing lithium (Li) is used, and therefore, the charge-discharge characteristics can be further improved, and also the capacity of the lithium battery 100 can be increased.

Next, the effects of the above-mentioned embodiment will be more specifically described by showing Examples and Comparative Examples with respect to the solid electrolyte according to the above-mentioned embodiment. FIG. 5 is a table showing the compositions of solid electrolytes according to Examples and Comparative Examples. The weight measurement in the following experiment was performed to 0.1 mg using an analytical balance ME204T (Mettler Toledo International, Inc.).

Examples and Comparative Examples

Preparation of Metal Compound Solution

First, by using a lithium compound, a lanthanum compound, a zirconium compound, a gallium compound, a calcium compound, a niobium compound, an antimony compound, a tantalum compound, and a solvent, the following metal compound solutions were prepared as metal element sources containing the metal compounds, respectively.

2-n-Butoxyethanol Solution of 1 Mol/Kg Lithium Nitrate

In a 30-g reagent bottle made of Pyrex (registered trademark) (trademark of Corning Incorporated) equipped with a magnetic stirrer bar, 1.3789 g of lithium nitrate (Kanto Chemical Co., Inc., 3N5) with a purity of 99.95% and 18.6211 g of 2-n-butoxyethanol (ethylene glycol monobutyl ether) (Kanto Chemical Co., Inc., Cica Special Grade) were weighed. Then, the bottle was placed on a magnetic stirrer with a hot plate function, and lithium nitrate was completely dissolved in 2-n-butoxyethanol while stirring at 190° C. for 1 hour. The resulting solution was gradually cooled to room temperature (about 20° C.), whereby a 2-n-butoxyethanol solution of 1 mol/kg lithium nitrate was obtained. The purity of lithium nitrate can be measured using an ion chromatography-mass spectrometer.

Ethyl Alcohol Solution of 1 Mol/Kg Gallium Nitrate n-Hydrate

In a 20-g reagent bottle made of Pyrex equipped with a magnetic stirrer bar, 3.5470 g of gallium nitrate n-hydrate (n=5.5, Kojundo Chemical Lab. Co., Ltd., 3N) and 6.4530 g of ethyl alcohol were weighed. Then, the bottle was placed on a magnetic stirrer with a hot plate function, and gallium nitrate n-hydrate (n=5.5) was completely dissolved in ethyl alcohol while stirring at 90° C. for 1 hour. The resulting solution was gradually cooled to room temperature, whereby an ethyl alcohol solution of 1 mol/kg gallium nitrate n-hydrate (n=5.5) was obtained. The hydration number n of the used gallium nitrate n-hydrate was 5.5 from the result of mass loss by a combustion experiment.

2-n-Butoxyethanol Solution of 1 mol/kg Lanthanum Nitrate Hexahydrate

In a 30-g reagent bottle made of Pyrex equipped with a magnetic stirrer bar, 8.6608 g of lanthanum nitrate hexahydrate (Kanto Chemical Co., Inc., 4N) and 11.3392 g of 2-n-butoxyethanol were weighed. Then, the bottle was placed on a magnetic stirrer with a hot plate function, and lanthanum nitrate hexahydrate was completely dissolved in 2-n-butoxyethanol while stirring at 140° C. for 30 minutes. The resulting solution was gradually cooled to room temperature, whereby a 2-n-butoxyethanol solution of 1 mol/kg lanthanum nitrate hexahydrate was obtained.

2-n-Butoxyethanol Solution of 1 mol/kg Calcium Nitrate Tetrahydrate

In a 20-g reagent bottle made of Pyrex equipped with a magnetic stirrer bar, 2.3600 g of calcium nitrate tetrahydrate (Kanto Chemical Co., Inc., 3N) and 7.6400 g of 2-n-butoxyethanol were weighed. Then, the bottle was placed on a magnetic stirrer with a hot plate function, and calcium nitrate tetrahydrate was completely dissolved in 2-n-butoxyethanol while stirring at 100° C. for 30 minutes. The resulting solution was gradually cooled to room temperature, whereby a 2-n-butoxyethanol solution of 1 mol/kg calcium nitrate tetrahydrate was obtained.

Butanol Solution of 1 Mol/Kg Zirconium Tetra-n-Butoxide

In a 20-g reagent bottle made of Pyrex equipped with a magnetic stirrer bar, 3.8368 g of zirconium tetra-n-butoxide (Wako Pure Chemical Industries, Ltd.) and 6.1632 g of butanol (n-butanol) were weighed. Then, the bottle was placed on a magnetic stirrer, and zirconium tetra-n-butoxide was completely dissolved in butanol while stirring at room temperature for 30 minutes, whereby a butanol solution of 1 mol/kg zirconium tetra-n-butoxide was obtained.

2-n-Butoxyethanol Solution of 1 Mol/Kg Niobium Pentaethoxide

In a 20-g reagent bottle made of Pyrex equipped with amagnetic stirrer bar, 3.1821 g of niobiumpentaethoxide (Wako Pure Chemical Industries, Ltd.) and 6.8179 g of 2-n-butoxyethanol were weighed. Then, the bottle was placed on amagnetic stirrer, and niobiumpentaethoxide was completely dissolved in 2-n-butoxyethanol while stirring at room temperature for 30 minutes, whereby a 2-n-butoxyethanol solution of 1 mol/kg niobium pentaethoxide was obtained.

2-n-Butoxyethanol Solution of 1 Mol/Kg Antimony tri-n-Butoxide

In a 20-g reagent bottle made of Pyrex equipped with a magnetic stirrer bar, 3.4110 g of antimony tri-n-butoxide (Wako Pure Chemical Industries, Ltd.) and 6.5890 g of 2-n-butoxyethanol were weighed. Then, the bottle was placed on a magnetic stirrer, and antimony tri-n-butoxide was completely dissolved in 2-n-butoxyethanol while stirring at room temperature for 30 minutes, whereby a 2-n-butoxyethanol solution of 1 mol/kg antimony tri-n-butoxide was obtained.

2-n-Butoxyethanol Solution of 1 Mol/Kg Tantalum penta-n-Butoxide

In a 20-g reagent bottle made of Pyrex equipped with a magnetic stirrer bar, 5.4640 g of tantalum penta-n-butoxide (Kojundo Chemical Lab. Co., Ltd.) and 4.5360 g of 2-n-butoxyethanol were weighed. Then, the bottle was placed on a magnetic stirrer, and tantalum penta-n-butoxide was completely dissolved in 2-n-butoxyethanol while stirring at room temperature for 30 minutes, whereby a 2-n-butoxyethanol solution of 1 mol/kg tantalum penta-n-butoxide was obtained.

Preparation of Mixture

Subsequently, in Examples and Comparative Examples, according to the compositions of the first electrolyte and the second electrolyte shown in FIG. 5, solutions containing the precursors of the first electrolyte and the second electrolyte as mixtures were prepared.

Solution Containing Precursors of $Li_{5.1}Ga_{0.5}La_{2.95}Ca_{0.05}Zr_{1.55}Nb_{0.25}Sb_{0.2}O_{12}$ of Examples 1 and 2

In Examples 1 and 2, a solution containing the precursors of $Li_{5.1}Ga_{0.5}La_{2.95}Ca_{0.05}Zr_{1.55}Nb_{0.25}Sb_{0.2}O_{12}$ was prepared. First, 6.1200 g of the 2-n-butoxyethanol solution of 1 mol/kg lithium nitrate, 0.5000 g of the ethyl alcohol solution of 1 mol/kg gallium nitrate n-hydrate (n=5.5), 2.9500 g of the 2-n-butoxyethanol solution of 1 mol/kg lanthanum nitrate hexahydrate, 0.0500 g of the 2-n-butoxyethanol solution of 1 mol/kg calcium nitrate tetrahydrate, 1.5500 g of the butanol solution of 1 mol/kg zirconium tetra-n-butoxide, 0.2500 g of the 2-n-butoxyethanol solution of 1 mol/kg niobium pentaethoxide, and 0.2000 g of the 2-n-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Examples 1 and 2 was obtained.

Solution Containing Precursors of $Li_{4.85}Ga_{0.5}La_{2.95}Ca_{0.05}Zr_{1.3}Sb_{0.45}Ta_{0.25}O_{12}$ of Examples 3 and 4

In Examples 3 and 4, a solution containing the precursors of $Li_{4.85}Ga_{0.5}La_{2.95}Ca_{0.05}Zr_{1.3}Sb_{0.45}Ta_{0.25}O_{12}$ was prepared. First, 5.8200 g of the 2-n-butoxyethanol solution of 1 mol/kg lithium nitrate, 0.5000 g of the ethyl alcohol solution of 1 mol/kg gallium nitrate n-hydrate (n=5.5), 2.9500 g of the 2-n-butoxyethanol solution of 1 mol/kg lanthanum nitrate hexahydrate, 0.0500 g of the 2-n-butoxyethanol solution of 1 mol/kg calcium nitrate tetrahydrate, 1.3000 g of the butanol solution of 1 mol/kg zirconium tetra-n-butoxide, 0.4500 g of the 2-n-butoxyethanol solution of 1 mol/kg antimony tri-n-butoxide, and 0.2500 g of the 2-n-butoxyethanol solution of 1 mol/kg tantalum penta-n-butoxide were weighed, and a magnetic stirrer bar was placed therein. Subsequently, stirring was performed at room temperature for 30 minutes using a magnetic stirrer, whereby a mixture of Examples 3 and 4 was obtained.

Solution Containing Precursors of $Li_{5.11}Ga_{0.5}La_{2.95}Ca_{0.05}Zr_{1.56}Nb_{0.22}Ta_{0.22}O_{12}$ of Examples 5 and 6

In Examples 5 and 6, a solution containing the precursors of $Li_{5.11}Ga_{0.5}La_{2.95}Ca_{0.05}Zr_{1.56}Nb_{0.22}Ta_{0.22}O_{12}$ was prepared. First, 6.1320 g of the 2-n-butoxyethanol solution of 1 mol/kg lithium nitrate, 0.5000 g of the ethyl alcohol solution of 1 mol/kg gallium nitrate n-hydrate (n=5.5), 2.9500 g of the 2-n-butoxyethanol solution of 1 mol/kg lanthanum nitrate hexahydrate, 0.0500 g of the 2-n-butoxyethanol solution of 1 mol/kg calcium nitrate tetrahydrate, 1.5600 g of the butanol solution of 1 mol/kg zirconium tetra-n-butoxide, 0.2200 g of the 2-n-butoxyethanol solution of 1 mol/kg niobium pentaethoxide, and 0.2200 g of the 2-n-butoxyethanol solution of 1 mol/kg tantalum penta-n-butoxide were weighed, and a magnetic stirrer bar was placed therein. Subsequently, stirring was performed at room temperature for 30 minutes using a magnetic stirrer, whereby a mixture of Examples 5 and 6 was obtained.

Solution Containing Precursors of $Li_{4.5}Ga_{0.5}La_{2.95}Ca_{0.05}Zr_{1.35}Nb_{0.25}Sb_{0.4}Ta_{0.4}O_{12}$ of Examples 7 and 8

In Examples 7 and 8, a solution containing the precursors of $Li_{4.5}Ga_{0.5}La_{2.95}Ca_{0.05}Zr_{1.35}Nb_{0.25}Sb_{0.4}Ta_{0.4}O_{12}$ was prepared. First, 5.4000 g of the 2-n-butoxyethanol solution of 1 mol/kg lithium nitrate, 0.5000 g of the ethyl alcohol solution of 1 mol/kg gallium nitrate n-hydrate (n=5.5), 2.9500 g of the 2-n-butoxyethanol solution of 1 mol/kg lanthanum nitrate hexahydrate, 0.0500 g of the 2-n-butoxyethanol solution of 1 mol/kg calcium nitrate tetrahydrate, 1.3500 g of the butanol solution of 1 mol/kg zirconium tetra-n-butoxide, 0.2500 g of the 2-n-butoxyethanol solution of 1 mol/kg niobium pentaethoxide, 0.4000 g of the 2-n-butoxyethanol solution of 1 mol/kg antimony tri-n-butoxide, and 0.4000 g of the 2-n-butoxyethanol solution of 1 mol/kg tantalum penta-n-butoxide were weighed, and a magnetic stirrer bar was placed therein. Subsequently, stirring was performed at room temperature for 30 minutes using a magnetic stirrer, whereby a mixture of Examples 7 and 8 was obtained.

Solution Containing Precursors of $Li_6Ga_{0.5}La_{2.5}Ca_{0.5}Zr_2O_{12}$ of Comparative Example 1

In Comparative Example 1, a solution containing the precursors of $Li_6Ga_{0.5}La_{2.5}Ca_{0.5}Zr_2O_{12}$ was prepared. First, 7.2000 g of the 2-n-butoxyethanol solution of 1 mol/kg lithium nitrate, 0.5000 g of the ethyl alcohol solution of 1 mol/kg gallium nitrate n-hydrate (n=5.5), 2.5000 g of the 2-n-butoxyethanol solution of 1 mol/kg lanthanum nitrate hexahydrate, 0.5000 g of the 2-n-butoxyethanol solution of 1 mol/kg calcium nitrate tetrahydrate, and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Comparative Example 1 was obtained. In Comparative Example 1, a first electrolyte in which the elements constituting the lithium composite metal oxide of the above compositional formula (1) are not substituted with another metal element is used, and a second electrolyte is not used.

Solution Containing Precursors of $Li_{6.5}La_3Zr_{1.5}Nb_{0.25}Sb_{0.25}O_{12}$ of Comparative Example 2

In Comparative Example 2, a solution containing the precursors of $Li_{6.5}La_3Zr_{1.5}Nb_{0.25}Sb_{0.25}O_{12}$ was prepared. First, 7.8000 g of the 2-n-butoxyethanol solution of 1 mol/kg lithium nitrate, 3.0000 g of the 2-n-butoxyethanol solution of 1 mol/kg lanthanum nitrate hexahydrate, 1.5000 g of the butanol solution of 1 mol/kg zirconium tetra-n-butoxide, 0.2500 g of the 2-n-butoxyethanol solution of 1 mol/kg niobium pentaethoxide, and 0.2500 g of the 2-n-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Comparative Example 2 was obtained. In Comparative Example 2, a first electrolyte in which lithium and lanthanum are not substituted in the lithium composite metal oxide of the above compositional formula (2) is used.

In the mixtures (the solutions containing the precursors) of Examples 1 to 8 and Comparative Examples 1 and 2, in consideration of the volatilization amount (release amount) of lithium by heating in a post-process, the 2-n-butoxyethanol solution of 1 mol/kg lithium nitrate was blended in an amount 1.2 times the molar ratio with respect to each of the predetermined theoretical compositions. The other metal compound solutions were blended in an equimolar ratio with respect to the theoretical compositions.

Production of Solid Electrolyte Pellet

Solid electrolyte pellets for evaluation are produced using the solutions containing the precursors of Examples 1, 3, 5, and 7, and Comparative Examples 1 and 2 prepared above. First, the solution containing the precursors is placed in a dish made of titanium having an inner diameter of 50 mm and a height of 20 mm. This dish is placed on a hot plate and heated for 1 hour by setting the set temperature of the hot plate to 180° C. so as to remove the solvent. Subsequently, the dish is heated for 30 minutes by setting the set temperature of the hot plate to 360° C. so as to decompose most of the contained organic components by combustion. Thereafter, the dish is heated for 1 hour by setting the set temperature of the hot plate to 540° C. so as to burn and decompose the remaining organic components. Thereafter, the dish is gradually cooled to room temperature on the hot plate, whereby a 540° C.-calcined body is obtained.

Subsequently, the 540° C.-calcined body is transferred to an agate mortar and sufficiently ground and mixed. A 0.2000-g portion is weighed out and pressed at a pressure of 0.624 kN/mm² (624 MPa) for 5 minutes using a molding die (a die with an exhaust port having an inner diameter of 10 mm), whereby a 540° C.-calcined body pellet (a disk-shaped molded body of the 540° C.-calcined body) is produced.

Then, the 540° C.-calcined body pellet is placed in a pot made of magnesium oxide, the pot is covered with a lid made of magnesium oxide, and then, the pellet is fired at 900° C. for 8 hours in an electric muffle furnace. Subsequently, the electric muffle furnace is gradually cooled to room temperature, and then, the pellet is taken out and used as a solid electrolyte pellet for evaluation having a diameter of about 9.5 mm and a thickness of about 800 μm.

The above operation was performed for the solutions containing the precursors of Examples and Comparative Examples, whereby the respective solid electrolyte pellets were produced. Since the first electrolyte and the second electrolyte of Examples 2, 4, 6, and 8 have the same compositions as those of Examples 1, 3, 5, and 7, respectively, the evaluation for Examples 2, 4, 6, and 8 were omitted.

Evaluation of Solid Electrolyte Pellet

With respect to each of the solid electrolyte pellets of Examples and Comparative Examples, the lithium ion conduction property was evaluated by the following method, and the results are shown in FIG. 6.

Figure 7:
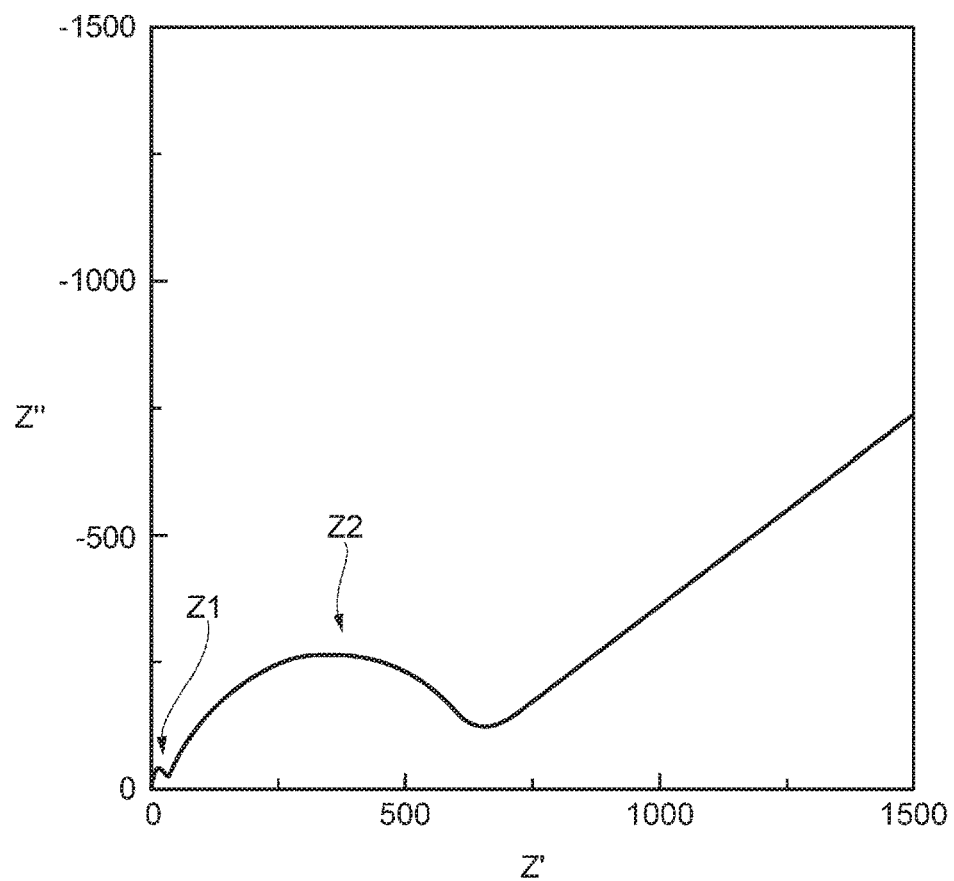
FIG. 7 is a graph showing a Cole-Cole plot which is the impedance spectrum of Comparative Example 1.

A gold electrode (ion blocking electrode) having a diameter of 8 mm was formed by gold sputtering on both front and back surfaces of the solid electrolyte pellet. Subsequently, by using an impedance analyzer SI 1260 (Solartron, Inc.), AC impedance measurement was performed. Thereafter, a lithium metal foil was pressed against the gold electrode on each of the both front and back surfaces of the solid electrolyte pellet, and AC impedance measurement with an activated electrode was performed. In the measurement, the AC amplitude was set to 10 mV and the measurement frequency was set to $10^7$ Hz to $10^{-1}$ Hz. An explanation will be provided by using Comparative Example 1 as one example of a Cole-Cole plot which is the obtained impedance spectrum. FIG. 7 is a graph showing a Cole-Cole plot which is the impedance spectrum of a sample in which a gold electrode (ion blocking electrode) having a diameter of 8 mm was formed by gold sputtering on both front and back surfaces of the solid electrolyte pellet of Comparative Example 1. In FIG. 7, the horizontal axis represents the real component of the impedance (Z') and the vertical axis represents the imaginary component of the impedance (Z"). Further, the grain bulk component of the spectrum is denoted by Z1, and the grain boundary component of the spectrum is denoted by Z2 in FIG. 7. Further, the dispersion of resistance in a low frequency region is caused by the ion blocking electrode. The lithium ion conductivities (the grain bulk conductivity, the grain boundary conductivity, and the total ion conductivity) were calculated from Z1 and Z2. In Examples 1, 3, 5, and 7, and Comparative Example 2, in the impedance spectrum (Cole-Cole plot), the grain bulk component (Z1) and the grain boundary component (Z2) were integrated and could not be separated. Therefore, only the total ion conductivity was calculated for these.

Figure 8:
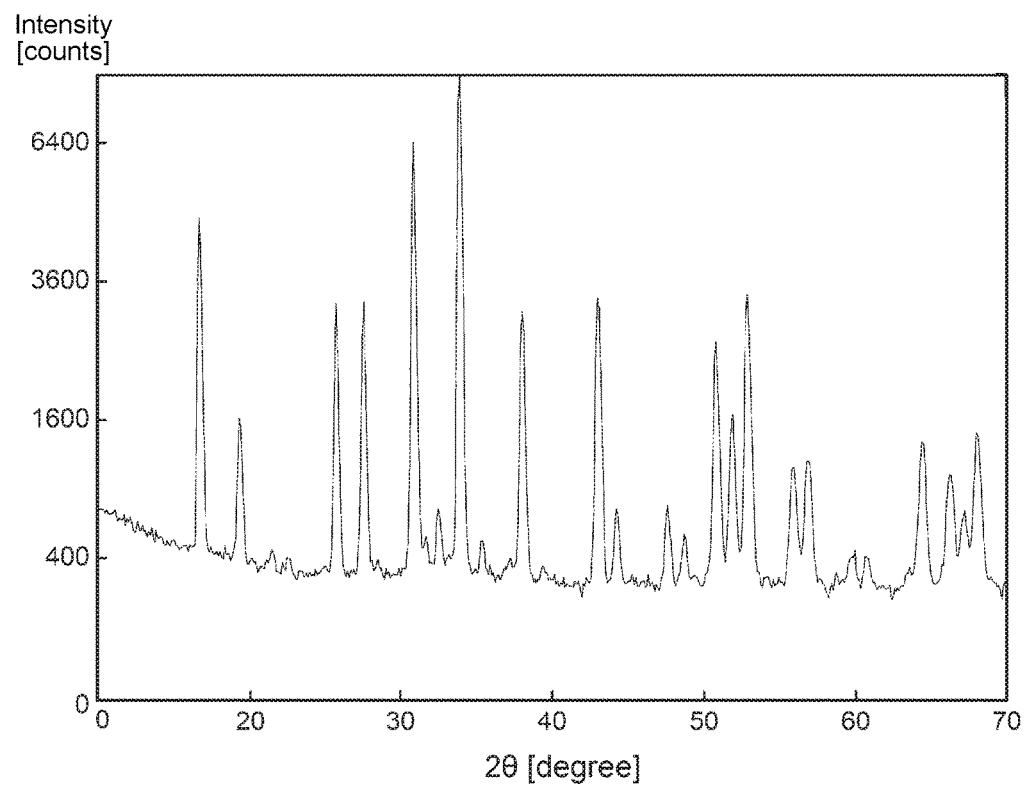
FIG. 8 is a diagram showing the X-ray diffraction chart of Example 1.

The solid electrolyte pellet of Example 1 was subjected to an X-ray diffraction (XRD) analysis, and the X-ray diffraction chart thereof is shown in FIG. 8. Specifically, byproduction or the like of impurities was examined using an X-ray diffractometer MRD (Philips).

Evaluation Results of Solid Electrolyte Pellet Lithium Ion Conduction Property

The evaluation results of the lithium ion conduction property will be described with reference to FIG. 6. FIG. 6 is a table showing the evaluation results of the lithium ion conductivities according to Examples and Comparative Examples. In Examples 1, 3, 5, and 7, the grain bulk component (Z1) and the grain boundary component (Z2) were integrated and could not be separated as described above. Therefore, in the columns of the grain bulk component and the grain boundary component, the symbol "-" is entered. That is, it was shown that at such a level, the grain boundary resistance is decreased as compared with Comparative Example 1. Further, the total ion conductivities of Examples 1, 3, 5, and 7 were all $5.0 \times 10^{-4}$ S/cm or more, and a favorable value was obtained, and therefore, it was shown that the lithium ion conduction property is improved.

On the other hand, it was found that in Comparative Example 1, the grain bulk component (Z1) and the grain boundary component (Z2) can be separated, and the grain boundary resistance is larger than in Examples. Further, in Comparative Example 1, the total ion conductivity was $2.0 \times 10^{-4}$ S/cm or less, and it was found that the lithium ion conductivity is lower than in Examples. In Comparative Example 2, the grain bulk component (Z1) and the grain boundary component (Z2) were integrated in the same manner as in Examples, however, the total ion conductivity was $2.0 \times 10^{-4}$ S/cm or less, and it was found that the lithium ion conductivity is lower than in Examples.

XRD Analysis

The examination results of byproduction or the like of impurities in the solid electrolyte pellet will be described with reference to FIG. 8. FIG. 8 is a diagram showing the X-ray diffraction chart of Example 1. In FIG. 8, the horizontal axis represents $2\theta$ and the vertical axis represents an intensity. As shown in FIG. 8, in Example 1, only the same diffraction peaks as those of $Li_{6.75}La_3Zr_{1.75}Nb_{0.25}O_{12}$ having a garnet-type crystal structure were observed, and diffraction peaks derived from impurities were not detected. That is, it was found that in Example 1, impurities are not detected, and the content of impurities is equal to or less than the lower detection limit of the X-ray diffractometer. Further, it was confirmed that niobium is contained in the crystal structure.

Production of Lithium Battery

Lithium batteries were produced using the solutions containing the precursors of Examples 1 to 8 and Comparative Examples 1 and 2, respectively. Specifically, $LiCoO_2$ was used as the positive electrode active material, a lithium foil (thickness: about 150 μm) was used as the negative electrode, and a copper foil (thickness: about 100 μm) was used as the first current collector and the second current collector. The thickness of the positive electrode was set to about 150 μm, the thickness of the electrolyte section was set to about 15 μm, and the effective diameter was set to about 8 mm.

Here, in Examples 1, 3, 5, and 7, the solid electrolyte was formed from the first electrolyte and the second electrolyte by repeating the formation of the first molded body (step S2) without using the third electrolyte, and the lithium battery was produced. On the other hand, in Examples 2, 4, 6, and 8, and Comparative Examples 1 and 2, lithium battery was produced by the above-mentioned method using LCBO as the third electrolyte.

Evaluation of Battery Characteristics

With respect to the lithium batteries of Examples and Comparative Examples, charge and discharge were performed in an environment at 25° C., and the discharge capacity retention ratio was evaluated as an index of the battery characteristics. The charge and discharge conditions at this time are shown in FIG. 9. FIG. 9 is a table showing the charge and discharge conditions and the evaluation results of the lithium batteries of Examples and Comparative Examples.

As shown in FIG. 9, in Examples 1, 3, 5, and 7, the charge and discharge currents were set to 50 μA (charge and discharge rates: 0.1 C), and in Examples 2, 4, 6, and 8, the charge and discharge currents were set to 150 μA (charge and discharge rates: 0.3 C). In Comparative Example 1, the charge was started by setting the charge current to 5 μA (charge rate: 0.01 C) at the beginning, however, constant voltage charge could not be performed, and the charge mode switched to constant current charge. Therefore, charge and discharge were performed by setting the charge and discharge currents to 1 μA (charge and discharge rates: 0.002 C). In Comparative Example 2, the charge and discharge currents were set to 20 μA (charge and discharge rates: 0.04 C).

The charge and discharge capacities when the above-mentioned charge and discharge were repeated were measured. Specifically, the charge and discharge capacities at the initial time (1st time) and the charge and discharge capacities after repeating 10 cycles of charge and discharge (10th time) were measured, and the discharge capacity retention ratio at the 10th time of charge and discharge operation with respect to the 1st time of charge and discharge operation was calculated. The results are shown in FIG. 9.

As shown in FIG. 9, it was found that in any of the lithium batteries of Examples 1 to 8, the discharge capacity retention ratio of 90% can be ensured. This showed that the lithium batteries of Examples have stable cycle characteristics and excellent battery characteristics.

On the other hand, in the lithium battery of Comparative Example 1, as described above, constant voltage charge at a charge current of 5 μA (charge rate: 0.01 C) could not be performed, and therefore, it was found that the grain boundary resistance in the solid electrolyte is high, and the use thereof as a lithium battery is difficult. It was also found that in both Comparative Examples 1 and 2, a discharge capacity retention ratio of 80% cannot be ensured, and the cycle characteristics are not stable and the battery characteristics are poor as compared with Examples.

Second Embodiment

Method for Producing Battery

Figure 10:
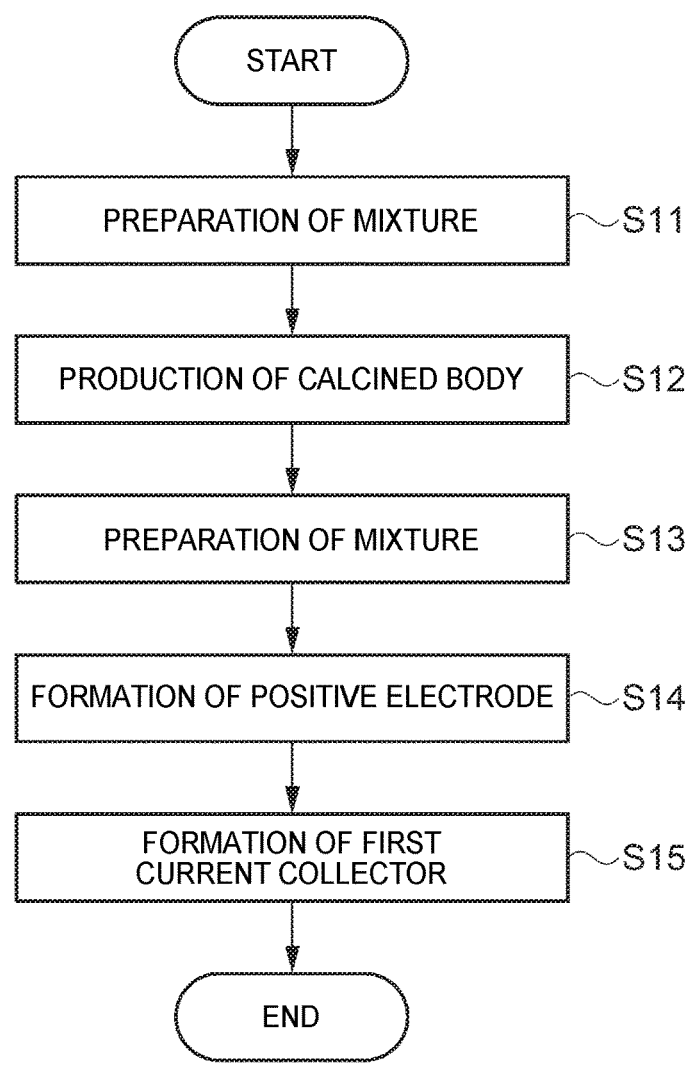
FIG. 10 is a process flowchart showing a method for producing a lithium battery as a battery according to a second embodiment.

A method for producing a lithium battery as a battery according to this embodiment will be described with reference to FIG. 10. FIG. 10 is a process flowchart showing a method for producing a lithium battery as a battery according to the second embodiment. In the production method of this embodiment, a method for producing a first electrolyte and a second electrolyte is included. The process flow shown in FIG. 10 is an example, and the method is not limited thereto. Further, the same reference numerals are used for the same constituent components as those of the first embodiment, and a repetitive description will be omitted.

The method for producing a lithium battery of this embodiment is a production method for directly forming a positive electrode as a composite body from a calcined body which is a forming material of a first electrolyte and a second electrolyte and an active material $2b$ without forming a first molded body (active material section 2).

Preparation of Mixture

In a step S11 shown in FIG. 10, in the same manner as in the first embodiment, a mixture containing precursors as the raw materials of a first electrolyte and a second electrolyte is prepared.

Production of Calcined Body

In a step S12, a calcined body is produced from the mixture. Specifically, the mixture is subjected to a first heating treatment, whereby removal of a solvent by volatilization and removal of an organic component by combustion or thermal decomposition are performed. The heating temperature is set to 500° C. or higher and 650° C. or lower. Subsequently, a solid material of the obtained mixture is ground and mixed, whereby a calcined body in a powdery form is produced.

In a step S13, the calcined body in a powdery form and an active material are mixed, whereby a mixture body is prepared. First, an active material $2b$ is prepared. Also in this embodiment, in the same manner as in the first embodiment, $LiCoO_2$ subjected to a classification operation is used as the active material. Subsequently, 0.0550 g of the calcined body in a powdery form and 0.0450 g of $LiCoO_2$ are sufficiently stirred and mixed, whereby 0.1000 g of a mixture body is formed.

In a step S14, a positive electrode as a composite body is formed. Specifically, by using a molding die, the mixture body is compression molded. For example, the mixture body is pressed at a pressure of 1019 MPa for 2 minutes using a molding die (a die with an exhaust port having an inner diameter of 10 mm), whereby a disk-shaped molded material (diameter: 10 mm, effective diameter: 8 mm, thickness: 350 μm) of the mixture body is produced.

Thereafter, the disk-shaped molded material is placed on a substrate or the like and is subjected to a second heating treatment. The heating temperature in the second heating treatment is set to 800° C. or higher and 950° C. or lower, and sintering of the grains of the active material $2b$ and formation of a crystalline first electrolyte and an amorphous second electrolyte are promoted. The time of the heating treatment is preferably set to, for example, 5 minutes or more and 36 hours or less, more preferably 4 hours or more and 14 hours or less.

According to this, an active material section 2 is formed from the active material $2b$, whereby an electron transfer pathway is formed, and also a positive electrode in which the active material section 2, the first electrolyte, and the second electrolyte are combined is formed.

In a step S15, a first current collector, an electrolyte section, a negative electrode, and the like are formed, whereby a lithium battery of this embodiment is produced. After the step S15, the same production method as in the first embodiment can be adopted.

As described above, by the method for producing a lithium battery according to this embodiment, in addition to the effects of the first embodiment, the following effect can be obtained. Since the positive electrode is directly formed from the calcined body, which is the forming material of the first electrolyte and the second electrolyte, and the active material $2b$, it is only necessary to perform the heating treatment at 800° C. or higher once, and so on, and the production step can be simplified.

Third Embodiment

Electronic Apparatus

Figure 11:
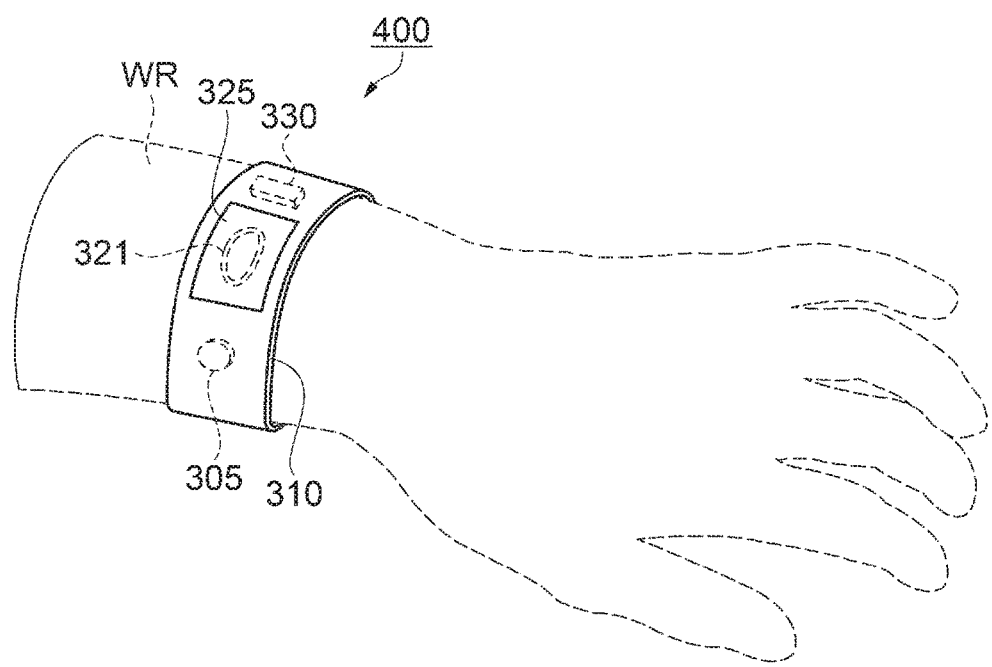
FIG. 11 is a schematic view showing a structure of a wearable apparatus according to a third embodiment.

An electronic apparatus according to this embodiment will be described with reference to FIG. 11. In this embodiment, a wearable apparatus will be described as an example of the electronic apparatus. FIG. 11 is a schematic view showing a structure of a wearable apparatus as the electronic apparatus according to the third embodiment.

As shown in FIG. 11, a wearable apparatus 400 of this embodiment is an information apparatus which is worn on, for example, the wrist WR of the human body using a band 310 like a watch, and obtains information related to the human body. The wearable apparatus 400 includes a battery 305, a display section 325, a sensor 321, and a processing section 330. As the battery 305, the lithium battery according to the above-mentioned embodiment is included.

The band 310 is formed in a belt shape using a resin having flexibility such as rubber so as to come into close contact with the wrist WR when it is worn. In an end portion of the band 310, a binding section (not shown) capable of adjusting the binding position according to the thickness of the wrist WR is provided.

The sensor 321 is disposed in the band 310 on the inner surface side (the wrist WR side) of the band 310 so as to come into contact with the wrist WR when it is worn. The sensor 321 obtains information related to the pulse rate, the blood glucose level, or the like of the human body when it comes into contact with the wrist WR, and outputs the information to the processing section 330. As the sensor 321, for example, an optical sensor is used.

The processing section 330 is incorporated in the band 310, and is electrically connected to the sensor 321 and the display section 325. As the processing section 330, for example, an integrated circuit (IC) is used. The processing section 330 performs arithmetic processing of the pulse rate, the blood glucose level, or the like based on the output from the sensor 321, and outputs display data to the display section 325.

The display section 325 displays the display data such as the pulse rate or the blood glucose level output from the processing section 330. As the display section 325, for example, a light-receiving type liquid crystal display device is used. The display section 325 is disposed on the outer surface side (a side opposite to the inner surface on which the sensor 321 is disposed) of the band 310 so that a wearer can read the display data when the wearer wears the wearable apparatus 400.

The battery 305 functions as a power supply source which supplies power to the display section 325, the sensor 321, and the processing section 330. The battery 305 is incorporated in the band 310 in an attachable and detachable manner.

According to the above configuration, the wearable apparatus 400 can obtain information related to the pulse rate or the blood glucose level of a wearer from the wrist WR and can display it as information such as the pulse rate or the blood glucose level through arithmetic processing or the like. Further, to the wearable apparatus 400, the lithium battery according to the above-mentioned embodiment having an improved lithium ion conduction property and a large battery capacity in spite of having a small size is applied, and therefore, the weight can be reduced, and the operating time can be extended. Moreover, since the lithium battery according to the above-mentioned embodiment is an all-solid-state secondary battery, the battery can be repetitively used by charging, and also there is no concern about leakage of the electrolyte solution or the like, and therefore, the wearable apparatus 400 which can be used safely for a long period of time can be provided.

In this embodiment, a watch-type wearable apparatus is illustrated as the wearable apparatus 400, however, the apparatus is not limited thereto. The wearable apparatus may be a wearable apparatus to be worn on, for example, the ankle, head, ear, waist, or the like.

The electronic apparatus to which the battery 305 (the lithium battery according to the above-mentioned embodiment) is applied as the power supply source is not limited to the wearable apparatus 400. As other electronic apparatuses, for example, a display to be worn on the head such as a head-mounted display, a head-up display, a portable telephone, a portable information terminal, a notebook personal computer, a digital camera, a video camera, a music player, a wireless headphone, a portable gaming machine, and the like can be exemplified. These electronic apparatuses may have another function, for example, a data communication function, a gaming function, a recording and playback function, a dictionary function, or the like.

Further, the electronic apparatus according to this embodiment is not limited to the use for general consumers and can also be applied to industrial use. Moreover, the apparatus to which the lithium battery according to the above-mentioned embodiment is applied is not limited to electronic apparatuses. For example, the lithium battery according to the above-mentioned embodiment may be applied as a power supply source for a moving object. Specific examples of the moving object include automobiles, motorcycles, forklifts, and flying objects such as unmanned planes. According to this, a moving object including a battery having an improved ion conduction property as a power supply source can be provided.

The invention is not limited to the above-mentioned embodiments and various changes, modifications, etc. can be added to the above-mentioned embodiments.

The entire disclosure of Japanese Patent Application No. 2017-121991, filed Jun. 22, 2017 is expressly incorporated by reference herein.

What is claimed is:
1. An electrolyte, comprising:
   a first electrolyte, in which an element constituting a crystalline lithium composite metal oxide represented by the following compositional formula (1) is substituted with a first metal element having a crystal radius of 78 pm or more; and
   an amorphous second electrolyte, which contains Li and a second metal element contained in the first electrolyte other than Li:

$$(Li_{7-3x+y}Ga_x)(La_{3-y}Ca_y)Zr_2O_{12} \qquad (1)$$

(wherein x and y satisfy the following formulae: $0.1 \leq x \leq 0.6$ and $0.0 < y \leq 0.3$).

2. The electrolyte according to claim 1, wherein in the first electrolyte, Zr among the elements constituting the lithium composite metal oxide is partially substituted with the first metal element.

3. The electrolyte according to claim 2, wherein the first electrolyte contains a crystalline lithium composite metal oxide represented by the following compositional formula (2):

$$(Li_{7-3x+y-z}Ga_x)(La_{3-y}Ca_y)(Zr_{2-z}M_z)O_{12} \qquad (2)$$

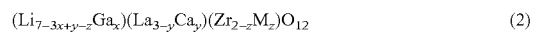

(wherein x, y, and z satisfy the following formulae: $0.1 \leq x \leq 0.6$, $0.0 < y \leq 0.3$, and $0.1 \leq z \leq 0.6$, and M represents a metal element having a crystal radius of 78 pm or more).

4. The electrolyte according to claim 1, wherein the first electrolyte contains any of Nb, Sb, and Ta as the first metal element.

5. The electrolyte according to claim 4, wherein the second electrolyte contains any of Nb, Sb, and Ta as the first metal element, and Li, La, and Zr.

6. The electrolyte according to claim 1, further comprising an amorphous third electrolyte, which contains Li and is in contact with the first electrolyte and the second electrolyte.

7. The electrolyte according to claim 6, wherein the third electrolyte contains Li, B, and O.

8. A battery, comprising:
   a composite body which contains the electrolyte according to claim 1 and an active material;
   an electrode which is provided on one side of the composite body; and
   a current collector which is provided on the other side of the composite body.

9. A battery, comprising:
   a composite body which contains the electrolyte according to claim 2 and an active material;
   an electrode which is provided on one side of the composite body; and
   a current collector which is provided on the other side of the composite body.

10. A battery, comprising:
    a composite body which contains the electrolyte according to claim 3 and an active material;
    an electrode which is provided on one side of the composite body; and
    a current collector which is provided on the other side of the composite body.

11. A battery, comprising:
    a composite body which contains the electrolyte according to claim 4 and an active material;
    an electrode which is provided on one side of the composite body; and
    a current collector which is provided on the other side of the composite body.

12. A battery, comprising:
    a composite body which contains the electrolyte according to claim 5 and an active material;
    an electrode which is provided on one side of the composite body; and
    a current collector which is provided on the other side of the composite body.

13. A battery, comprising:
    a composite body which contains the electrolyte according to claim 6 and an active material;
    an electrode which is provided on one side of the composite body; and a current collector which is provided on the other side of the composite body.

14. A battery, comprising:

a composite body which contains the electrolyte according to claim 7 and an active material;

an electrode which is provided on one side of the composite body; and a current collector which is provided on the other side of the composite body.

15. The battery according to claim 8, wherein the active material is a positive electrode active material containing Li.

16. An electronic apparatus, comprising the battery according to claim 8.

17. An electronic apparatus, comprising the battery according to claim 15.

* * * * *